United States Patent
Kobayashi et al.

(10) Patent No.: US 9,171,570 B2
(45) Date of Patent: Oct. 27, 2015

(54) INFORMATION PROCESSING APPARATUS, INFORMATION PROCESSING SYSTEM, INFORMATION PROCESSING METHOD, AND PROGRAM

(75) Inventors: Yoshiyuki Kobayashi, Tokyo (JP); Tateo Oishi, Saitama (JP); Kenjiro Ueda, Kanagawa (JP); Kazuo Yamamoto, Chiba (JP); Motoki Kato, Kanagawa (JP)

(73) Assignee: Sont Corporation, Tokyo (JP)

( * ) Notice: Subject to any disclaimer, the term of this patent is extended or adjusted under 35 U.S.C. 154(b) by 149 days.

(21) Appl. No.: 13/076,928

(22) Filed: Mar. 31, 2011

(65) Prior Publication Data

US 2011/0252058 A1    Oct. 13, 2011

(30) Foreign Application Priority Data

Apr. 8, 2010    (JP) ................ P2010-089914

(51) Int. Cl.
| | |
|---|---|
| G06F 17/30 | (2006.01) |
| G11B 20/00 | (2006.01) |
| G06F 21/10 | (2013.01) |
| H04N 5/913 | (2006.01) |
| H04N 21/4627 | (2011.01) |

(52) U.S. Cl.
CPC .......... *G11B 20/00086* (2013.01); *G06F 21/10* (2013.01); *G11B 20/00159* (2013.01); *G11B 20/00427* (2013.01); *G11B 20/00528* (2013.01); *G11B 20/00739* (2013.01); *G11B 20/00855* (2013.01); *H04N 5/913* (2013.01); *H04N 21/4627* (2013.01); *G06F 2221/2107* (2013.01); *G06F 2221/2149* (2013.01); *G06F 2221/2153* (2013.01); *G11B 2220/2541* (2013.01)

(58) Field of Classification Search
CPC ............. G11B 20/00086; G11B 27/10; G11B 20/00427; G11B 20/00166; G11B 20/00688; G06F 21/10; G06F 2221/2107; G06F 2221/2149; G06F 2221/2153; G06F 17/3087; G06F 17/30241; G06F 3/04817; G06F 17/30572; G06F 2203/04806; H04N 21/835; H04N 21/4627; H04N 5/913
USPC .......................... 707/697, 698, 728; 709/203
See application file for complete search history.

(56) References Cited

U.S. PATENT DOCUMENTS

| | | | |
|---|---|---|---|
| 2005/0198115 A1* | 9/2005 | Sugimoto et al. ............. | 709/203 |
| 2009/0204572 A1* | 8/2009 | Takashima et al. ............. | 707/3 |

FOREIGN PATENT DOCUMENTS

JP    2008-98765    4/2008

OTHER PUBLICATIONS

U.S. Appl. No. 13/046,018, filed Mar. 11, 2011, Kobayashi, et al.
U.S. Appl. No. 13/046,935, filed Mar. 14, 2011, Kobayashi, et al.
U.S. Appl. No. 13/043,658, filed Mar. 9, 2011, Kobayashi, et al.
U.S. Appl. No. 13/048,210, filed Mar. 15, 2011, Kobayashi, et al.

* cited by examiner

*Primary Examiner* — Ann Lo
(74) *Attorney, Agent, or Firm* — Sony Corporation

(57) ABSTRACT

An information processing apparatus includes: a data processing unit which performs copy processing for recording recorded data of a first medium in a second medium, wherein the data processing unit receives playlist sequence information which represents the use sequence of a playlist applied to reproduction processing of copy data recorded in the second medium, from a management server and performs processing for generating an attribute file which stores the playlist sequence information and recording the generated attribute file in the second medium.

17 Claims, 28 Drawing Sheets

FIG. 2

| INDEX | CONTENT MANAGEMENT UNIT (CPS) | UNIT KEY (CPS UNIT KEY) |
|---|---|---|
| TITLE 1 | CPS1 | Ku1 |
| TITLE 2 | CPS2 | Ku2 |
| TITLE 3 | CPS3 | Ku3 |
| ∶ | ∶ | ∶ |
| TITLE n | CPSn | Kun |

FIG.5

MCMF (MANAGED COPY MANIFEST FILE)

| ELEMENT | | NOTE |
|---|---|---|
| MANAGEMENT SERVER URL (URL OF MCS) | | URL OF MANAGEMENT SERVER OF ACCESS DESTINATION |
| COPY DATA INFORMATION (File name to be copied) | PLAYLIST FILE NAME | PLAYLIST FILE NAME TO BE COPIED (CLIP CAN BE SPECIFIED ON THE BASIS OF PLAYLIST) |
| | CPS UNIT KEY INFORMATION (Index to identify the CPS Unit Key) | ENCRYPTION KEY WHICH IS APPLIED TO DECRYPTION PROCESSING |
| | COPY UNIT IDENTIFIER (MCUi) | INFORMATION FOR IDENTIFYING COPY UNIT AS MC (Managed Copy) EXECUTION UNIT |
| CONTENT ID | | CONTENT IDENTIFIER |

FIG. 6

COPY EXECUTION REQUEST (Offer Request)

| ELEMENT | NOTE |
|---|---|
| CONTENT ID | CONTENT IDENTIFIER |
| CONTENT CERTIFICATE ID | IDENTIFIER OF CONTENT CERTIFICATE |
| MEDIUM IDENTIFIER (Pre-recorded Media Serial Number) | IDENTIFIER SPECIFIC TO MEDIUM |
| RANDOM NUMBER (memNonce) | DATA FOR DATA INTEGRITY CONFIRMATION |
| LANGUAGE CODE | USED TO DETERMINE DISPLAY LANGUAGE AND THE LIKE, SUCH AS PRICELIST |

FIG.7

BASIC INFORMATION OF SERVER RESPONSE INFORMATION (Offer Response)

| ELEMENT | | | NOTE |
|---|---|---|---|
| DETAILED OFFER INFORMATION (Offer) | TITLE/ABSTRACT/DESCRIPTION | | IDENTIFICATION INFORMATION OF CONTENT PERMITTED TO BE COPIED (To identify content by MCS) |
| | COPY UNIT IDENTIFIER (MCUi) | | IDENTIFICATION INFORMATION OF COPY UNIT AS UNIT FOR COPY (To identify Managed Copy Unit (item for sale)) |
| | PRICE INFORMATION/AUXILIARY PRICE INFORMATION (price/priceInfo) | | COPY PRICE INFORMATION (priceInfo is additional information regarding price (e.g. remaining copy count)) |
| | SERIAL NUMBER (serialNumberRequired) | | SERIAL NUMBER SET BY SERVER (To indicate if sticker code input is required or not) |
| | SETTLEMENT SERVER URL (financialHTMLURL) | | SETTLEMENT SERVER ACCESS INFORMATION (URL OF financial server (may be different from MCS)) |
| | COPY DESTINATION INFORMATION (mcotInfo) | | INFORMATION OF APPARATUS OR MEDIUM AS COPY DESTINATION (Information regarding copy destination) |
| RANDOM NUMBER (mcmNonce) | | | DATA FOR DATA INTEGRITY CONFIRMATION (To compare with mcmNonce which MCM sent) |
| COPY DATA INFORMATION [File name to be copied (dealManifest)] | PLAYLIST FILE NAME | | SPECIFICATION INFORMATION OF FILE AS COPY PROCESSING TARGET (To identify Clip AV stream(s) and Clip Information) |
| | CPS UNIT KEY INFORMATION (Index to identify the CPS Unit Key) | | KEY INFORMATION FOR CONTENT DECRYPTION (To decrypt Clip AV stream(s)) |
| | COPY UNIT IDENTIFIER (MCUi) | | COPY UNIT IDENTIFICATION INFORMATION AS UNIT FOR COPY (To identify Managed Copy Unit (item for sale)) |
| SERVER PUBLIC KEY CERTIFICATE (MCScert) | | | PUBLIC KEY CERTIFICATE STORING PUBLIC KEY OF MANAGEMENT SERVER (Including MCS public key) |
| SIGNATURE | | | DATA FOR DATA INTEGRITY CONFIRMATION (To verify integrity of offer) |

FIG.9

ADDITIONAL INFORMATION OF SERVER RESPONSE INFORMATION (Offer Response) (IN TERMS OF COPY UNIT (MCU))

| | ELEMENT | NOTE |
|---|---|---|
| (1) FIRST COPY RESTRICTION INFORMATION | (1a) REGION RESTRICTION INFORMATION (region) | REGION A, REGION B, REGION C, REGION D, ... |
| | (1b) AGE RESTRICTION INFORMATION (age) | 13 OR OLDER, 18 OR OLDER, ... |
| | (1c) THREE-DIMENSIONAL IMAGE (3D) RESTRICTION INFORMATION | (p1) INHIBIT CONVERSION FROM 3D TO 2D AND COPYING<br>(p2) PERMIT CONVERSION FROM 3D TO 2D AND COPYING, BUT INHIBIT REPRODUCTION OF 2D<br>(p3) PERMIT CONVERSION FROM 3D TO 2D AND COPYING, AND PERMIT REPRODUCTION OF 2D<br>(q1) PERMIT CONVERSION TO DIFFERENT 3D FORMAT AND COPY<br>(q2) INHIBIT CONVERSION TO DIFFERENT 3D FORMAT AND COPY |
| (2) SECOND COPY RESTRICTION INFORMATION | SELECTION RESTRICTION INFORMATION [selection: AUDIO (audio)/SUBTITLE (subtitle)/ANGLE (angle)+ANGLE INFORMATION (angleinfo)] | AUDIO (audio)=-1 (UNDESIGNATED), 1 (EN), 2 (JP), 3 ...<br>SUBTITLE (subtitle)=-1 (UNDESIGNATED), 1 (EN), 2 (JP), 3 ...<br>ANGLE (angle)=-1 (UNDESIGNATED), 1, 2, 3 ...<br>ANGLE INFORMATION (angleinfo)=DESCRIPTION INFORMATION OF EACH ANGLE |
| (3) PLAYLIST SEQUENCE INFORMATION | | PLAYLIST #3→PLAYLIST #5→PLAYLIST#8 ... |

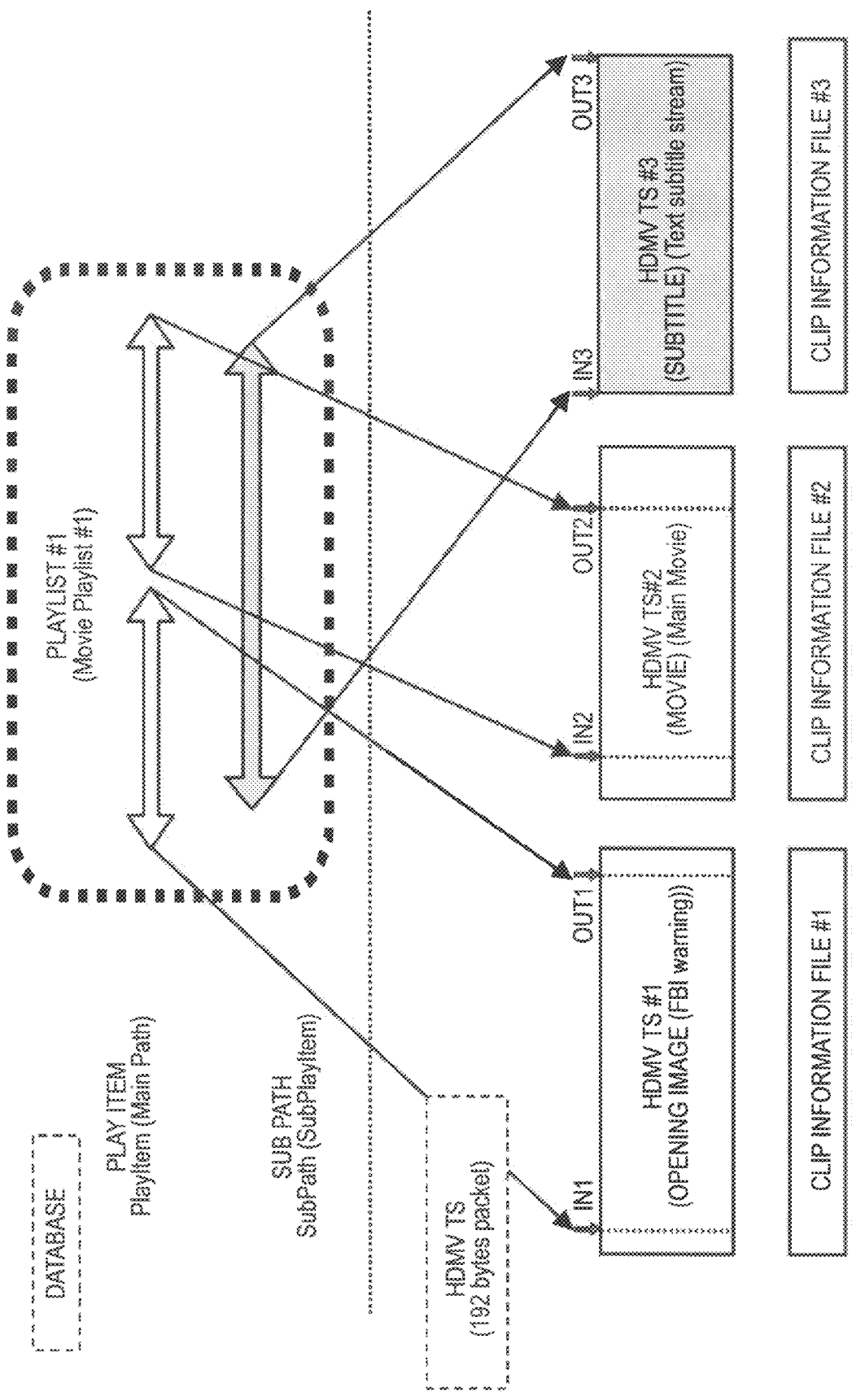

FIG.16

DISPLAY LIST (Offer list) BASED ON SERVER RESPONSE INFORMATION (REGION (region) IS OUT OF ALLOWABLE RANGE).
WHEN COPY RESTRICTION REGION (region) INFORMATION OF COPY PERMISSION INFORMATION IS A, AND REGION (region) OF REPRODUCING APPARATUS IS B, C)

| OFFER LIST | | |
|---|---|---|
| TITLE / ABSTRACT | PRICE | INFORMATION |
| REGION (Region) IS NOT IDENTICAL. | | |

DETAIL
DETAIL
DETAIL

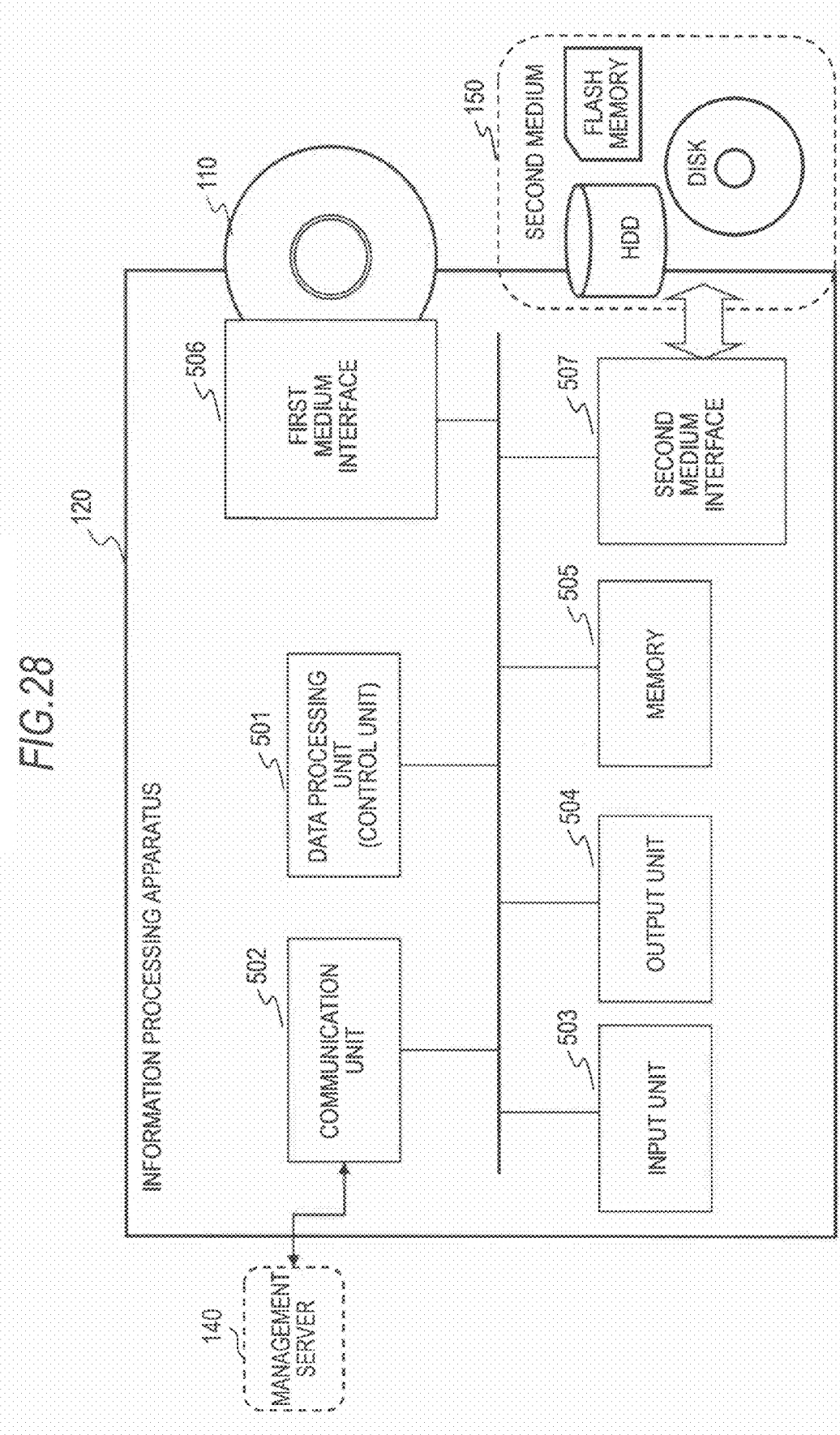

INFORMATION PROCESSING APPARATUS, INFORMATION PROCESSING SYSTEM, INFORMATION PROCESSING METHOD, AND PROGRAM

BACKGROUND OF THE INVENTION

1. Field of the Invention

The present invention relates to an information processing apparatus, an information processing system, an information processing method, and a program. In particular, the present invention relates to an information processing apparatus, an information processing system, an information processing method, and a program which copy data recorded in a medium (information recording medium), such as a disc, under a predetermined control.

2. Description of the Related Art

At present, as the information recording mediums for various contents, such as movies and music, DVDs (Digital Versatile Disc), BD (Blu-ray Disc (Registered Trademark)), or the like are widely used. With regard to most contents, such as music data or image data recorded in the information recording medium, a creator, a seller, or the like holds copyright or distribution rights. Thus, even a user who purchases a disc has predetermined restriction on the use of contents recorded in the disc. For example, the user is not permitted to copy contents recorded in the disc to another medium, such as a disc, without permission.

As the copy management configuration of contents stored in a medium, a copy permission processing configuration is used under the condition that copy permission information is received from a management server. Specifically, processing is performed in the following sequence.

A user loads a medium, such as a disc with recorded contents, into a PC, a recording/reproducing apparatus, or the like, and a user apparatus is connected to a management server through a network. Thereafter, the user apparatus transmits predefined information, such as a disc identifier (ID), to the server. After confirming the integrity of the received information, the server transmits copy permission information to the user apparatus. The user apparatus can start copy processing under the condition that the copy permission information is received from the server.

Such a copy management configuration is called managed copy (MC) and the details thereof are described in, for example, JP-A-2008-98765.

As the standard relating to content copyright protection techniques, an AACS (Advanced Access Content System) standard is used. Most of contents recorded in a disc, such as a BD, based on the AACS standard are recorded as encrypted contents. As a representative encryption technique based on the AACS standard, a configuration is known in which contents are segmented in terms of units, and different encryption keys are applied to the units. This encryption configuration allows control for the use of contents in terms of units, realizing strict content usage control in various ways.

A unit as the content segmentation unit is called a CPS unit, and an encryption key which is applied to encryption processing or decryption processing of each CPS unit is called a CPS unit key, a unit key, or a title key.

With regard to the AACS standard, reference is made to http://www.aacsla.com/home, http://www.aacsla.com/specifications, or the like.

In the user apparatus, in copying contents stored in a medium, such as a BD (Blu-ray Disc (Registered Trademark)) which stores movies or the like subjected to copyright management to another medium, for example, a hard disc, a flash memory, or another disc, when processing based on the above-described managed copy (MC), copy permission information is received from the management server, and copying is carried out.

However, in the copy control processing, such as the managed copy (MC), which is used at present, only a configuration is realized in which the management server provides copy permission or inhibition information to the user apparatus for contents as the user desires.

SUMMARY OF THE INVENTION

It is desirable to provide an information processing apparatus, an information processing system, an information processing method, and a program in which, in a configuration in which a user apparatus acquires copy permission information from a management server and copies contents between mediums, the management server provides additional information to a user apparatus, in addition to copy permission or inhibition information, and the user apparatus can carry out optimum copying on the basis of additional information.

An embodiment of the invention provides an information processing apparatus. The information processing apparatus includes a data processing unit which performs copy processing for recording recorded data of a first medium in a second medium. The data processing unit receives playlist sequence information which represents the use sequence of a playlist applied to reproduction processing of copy data recorded in the second medium, from a management server and performs processing for generating an attribute file which stores the playlist sequence information and recording the generated attribute file in the second medium.

In the information processing apparatus, the playlist sequence information may be set as data corresponding to copy units which are a plurality of copy processing unit data included in recorded data of the first medium, and the data processing unit may perform processing for generating an attribute file which stores playlist sequence information corresponding to a copy unit selected as a copy target and recording the generated attribute file in the second medium.

In the information processing apparatus, when reproduction control is possible using playlist sequence information, which is recording information of the attribute file, during reproduction processing of copy data from the second medium, the data processing unit may perform the processing for generating and recording the attribute file.

In the information processing apparatus, when the second medium is a hard disc, the data processing unit may determine that reproduction control is possible using playlist sequence information, which is recording information of the attribute file, during reproduction processing of copy data and may perform the processing for generating and recording the attribute file.

Another embodiment of the invention provides an information processing system. The information processing system includes an information processing apparatus which performs copy processing for recording recorded data of a first medium in a second medium, and a management server which provides information relating to the copy processing to the information processing apparatus. The information processing apparatus transmits a copy execution request to copy recorded data of the first medium to the management server. The management server transmits server response information to the information processing apparatus when receiving the copy execution request. The information processing apparatus performs processing for generating an attribute file which stores playlist sequence information included in the server response information and recording the generated attribute file in the second medium.

Still another embodiment of the invention provides an information processing method which is executed in an information processing apparatus performing copy processing for recording recorded data of a first medium in a second medium. The information processing method includes the step of causing a data processing unit to receive playlist sequence information representing the use sequence of a playlist applied to reproduction processing of copy data recorded in the second medium from a management server, and to perform processing for generating an attribute file which stores the playlist sequence information and recording the generated attribute file in the second medium.

Yet another embodiment of the invention provides a program which causes an information processing apparatus performing copy processing for recording recorded data of a first medium in a second medium to perform information processing. The information processing includes the step of causing a data processing unit to receive playlist sequence information representing the use sequence of a playlist applied to reproduction processing of copy data recorded in the second medium from a management server, and to perform processing for generating an attribute file which stores the playlist sequence information and recording the generated attribute file in the second medium.

The program is a program which can be provided to an information processing apparatus or a computer system capable of executing various program codes in a computer-readable form through a storage medium or a communication medium. The program is provided in a computer-readable form, realizing processing based on the program on the information processing apparatus or the computer system.

Other objects, features, and advantages of the invention will be apparent from the detailed description based on examples of the invention and the accompanying drawings. The system in this specification is a logical set of multiple apparatuses and is not limited to a system in which apparatuses having respective configuration are provided in the same housing.

The embodiments of the invention provide a configuration which can copy playlist sequence information applied to reproduction of copy data during data copy processing between mediums and can be used at the time of reproduction. In the information processing apparatus which performs copy processing for recording recorded data of the first medium in the second medium, the data processing unit performs processing for generating the attribute file which stores playlist sequence information representing the use sequence of a playlist applied to the reproduction processing of copy data included in received information from the management server and recording the attribute file in the copy destination. In reproducing copy data recorded in the second medium, the playlist sequence information is acquired from the attribute file, and the reproduction processing is performed in accordance with the acquired playlist sequence information, realizing correct content reproduction.

BRIEF DESCRIPTION OF THE DRAWINGS

FIG. 2 is a diagram illustrating a unit configuration and a unit key management table.

FIG. 5 is a diagram illustrating configuration data of a copy control management file (MCMF (Managed Copy Manifest File)) as recorded information of a first medium.

FIG. 6 is a diagram showing an example of data included in a copy execution request.

FIG. 7 is a diagram illustrating basic information included in server response information (Offer List) 131.

FIG. 9 is a diagram illustrating a data example of additional information recorded in server response information (Offer Response).

FIG. 10 is a diagram illustrating content reproduction processing using a playlist.

FIG. 16 is a diagram illustrating a display example of a content list based on server response information (Offer Response) which is provided from a management server.

FIG. 28 is a diagram illustrating an example of the configuration of an information processing apparatus.

DESCRIPTION OF THE PREFERRED EMBODIMENTS

Figure 1:
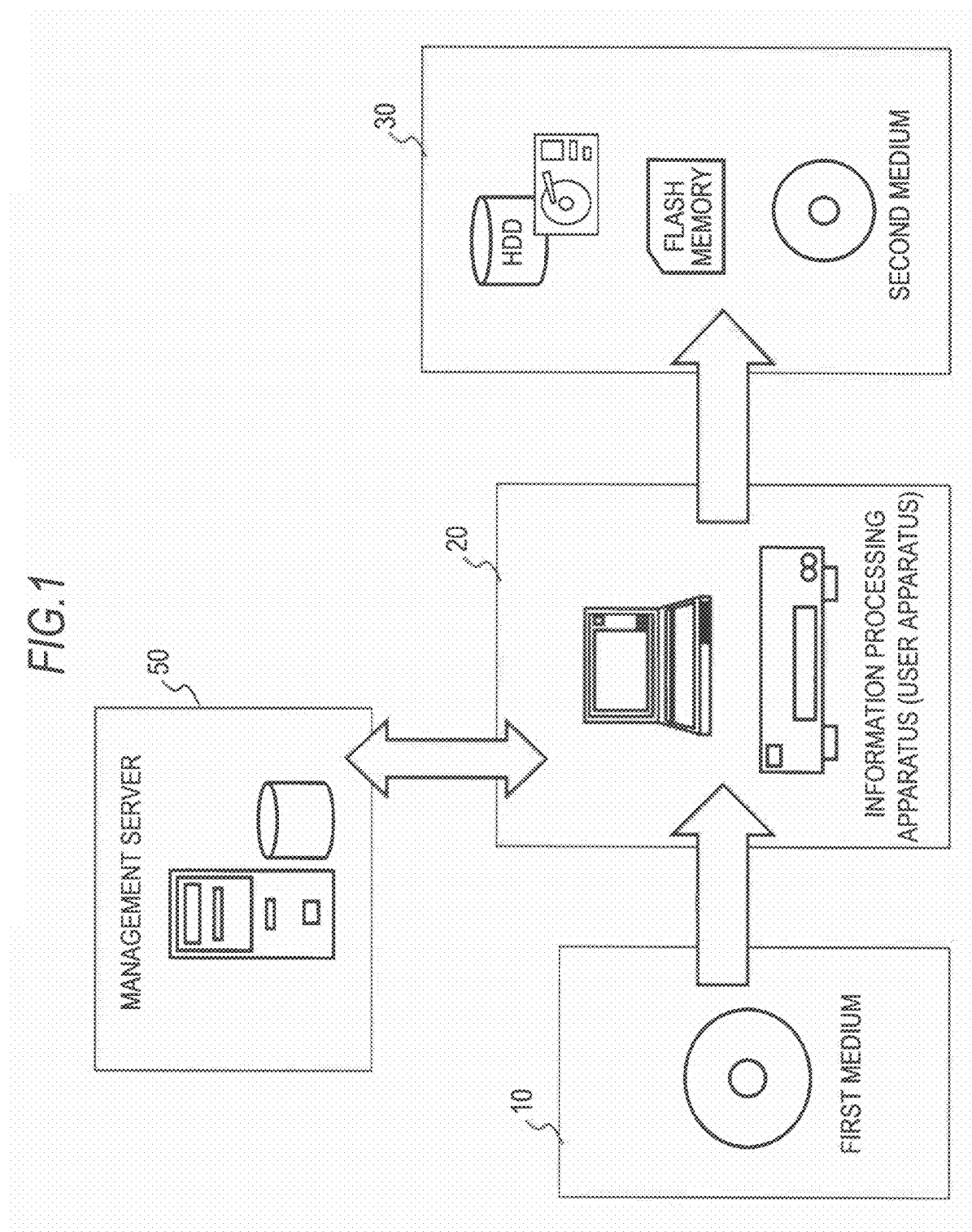
FIG. 1 is a diagram illustrating the outline of a managed copy (MC) system.

Hereinafter, the details of an information processing apparatus, an information processing system, an information processing method, and a program will be described with reference to the drawings. The description will be provided in accordance with the following items.

1. Outline of copy control processing of contents based on server management
2. Example of recording configuration of contents
3. Copy processing sequence of contents based on server management
4. Additional information which is recorded in server response information provided from management server
   4-1. Region restriction information (region)
   4-2. Age restriction information (age)
   4-3. Three-dimensional image (3D) restriction information
   4-4. Selection restriction information (selection)
   4-5. Playlist sequence information
5. Example where attribute file storing additional information relating to copy restriction provided from management server is generated and recorded in copy destination medium
6. Specific example and display example of server response information (Offer Response) provided from management server
7. Processing sequence in information processing apparatus
   7-1. Overall processing sequence in which copy processing of contents to second medium as copy destination is performed and attribute file is recorded
   7-2. Overall processing sequence in which copy processing of contents to second medium as copy destination is performed (no attribute file is recorded)
   7-3. Reproduction processing sequence of copy data
8. Configuration example of information processing apparatus

[1. Outline of Copy Control Processing of Contents Based on Server Management]

First, the outline of copy control processing of contents based on server management will be described with reference to FIG. 1.

For example, the use of most of contents, such as movies, recorded in a BD (Blu-ray Disc (Registered Trademark)) is permitted under predetermined copyright management. Thus, even a user who purchases the disc undergoes a predetermined restriction on the use of contents recorded in the disc. For example, the user is not permitted to copy contents recorded in the disc to another medium, such as a disc, without permission.

As the copy management configuration of contents recorded in a medium, a copy permission processing configuration is known under the condition that copy permission information is received from a management server. FIG. 1 is a diagram illustrating the outline of a managed copy (MC) system as an example.

An information processing apparatus 20 is a PC, a recorder (recording/reproducing apparatus), or the like of a user, and can have loaded therein and reproduce a first medium 10 in which movies or the like as contents subjected to copyright management is recorded.

The information processing apparatus 20 can perform processing for copying contents recorded in the first medium 10 to a second medium 30 as another medium. The second medium 30 is a medium which is recordable in the information processing apparatus 20, and is, for example, a hard disc (HDD), a flash memory, or a medium, such as a data-recordable disc (BD, DVD, or the like).

However, if the user freely carried out copy processing, content duplication occurs in large quantities, and unauthorized use or distribution occurs. In order to prevent such a situation, when the information processing apparatus 20 copies contents, the information processing apparatus 20 is connected to the management server 50 and receives copy permission information from the management server 50. In receiving the copy permission information, for example, a procedure, such as confirmation of integrity of the first medium or payment of a predetermined fee, or the like, is necessary.

The information processing apparatus 20 serving as a user apparatus carries out a predetermined procedure to receive the copy permission information from the management server 50 and to copy contents under the condition that the copy permission information is received. This is the outline of managed copy (MC).

[2. Example of Recording Configuration of Contents]

Next, a configuration example of data recorded in a medium (the first medium 10 of FIG. 1) in which contents subjected to copyright management as a target of the managed copy (MC) are recorded will be described.

Most contents, such as movies recorded in a general disc having recorded contents, for example, a BD (Blu-ray Disc (Registered Trademark)) are encrypted and recorded so as to prevent unauthorized use, such as unauthorized copy.

As described above, encrypted contents based on the AACS (Advanced Access Content System) standard relating to the content copyright protection techniques are segmented in terms of units and recorded as encrypted data using different encryption keys for the units. With the encryption configuration in terms of units, it becomes possible to perform usage control in terms of units, realizing strict content usage control in various ways.

A unit as the content segmentation unit is called a content management unit or a CPS unit, and an encryption key corresponding to each CPS unit is called a CPS unit key, a unit key, or a title key. FIG. 1 shows an example of the correspondence relationship between unit segmentation of a content recorded in a disc and an encryption key (unit key).

FIG. 1 shows an example of a unit key management table which represents the correspondence relationship between a unit (CPS unit) constituting contents recorded in a certain medium, for example, a single disc and a CPS unit key as an encryption key. The unit key management table is recorded in a medium (BD or the like) along with encrypted contents.

As shown in FIG. 1, CPS units which are content configuration data include CPS units 1 to n. A CPS unit key as a specific encryption key is associated with each of the CPS units 1 to n.

For example, in reproducing the CPS unit 1 (CPS1), decryption is carried out using a CPS unit key 1 (Ku1). In reproducing a CPS unit 2 (CPS2), it is necessary to carry out decryption using a CPS unit key 2 (Ku2). As an index corresponding to each CPS unit and each CPS unit key, for example, a "title" is used. The "title" is an index which is set to correspond to each CPS unit, and the title is specified such that a CPS unit and a CPS unit key can be specified.

Figure 3:
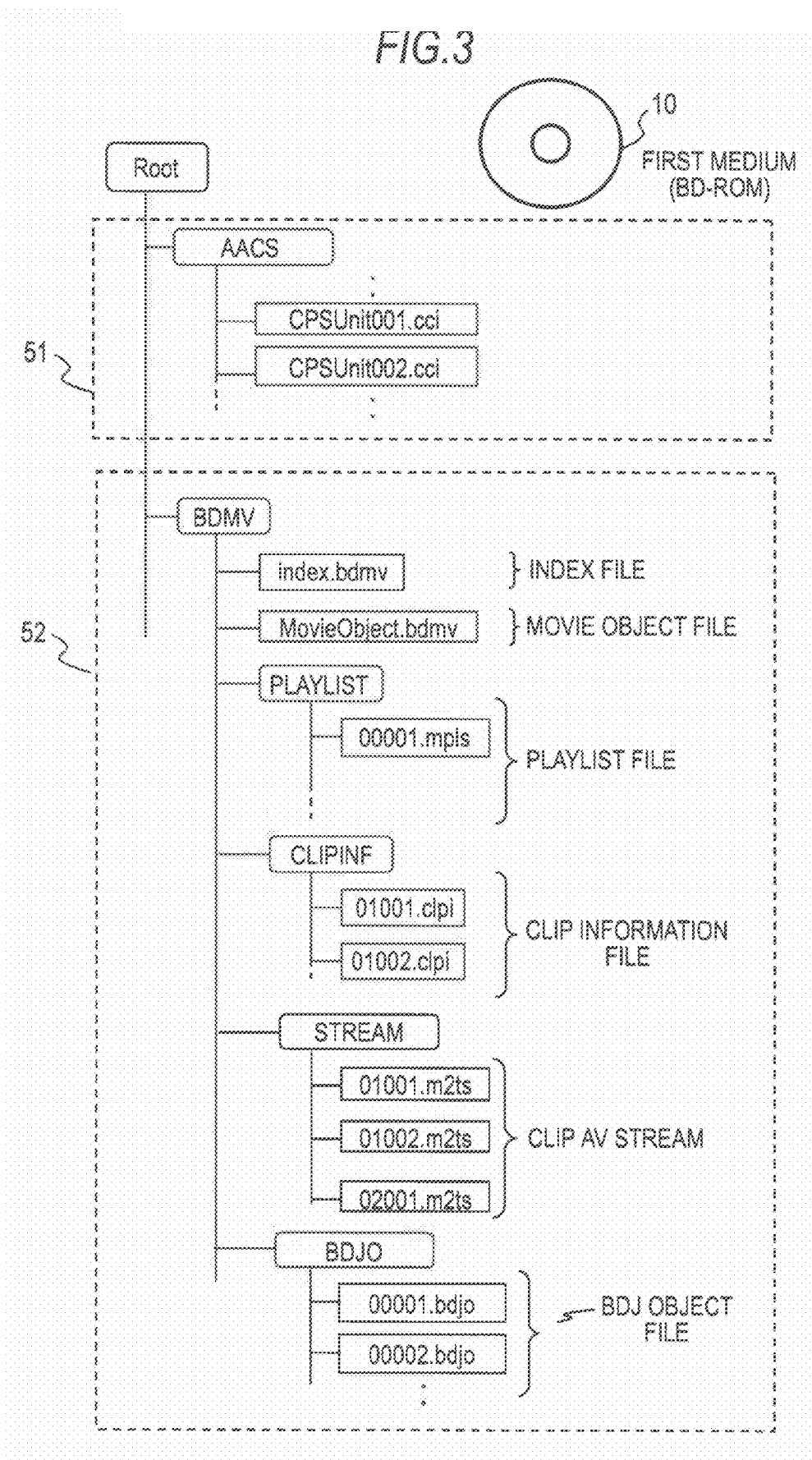
FIG. 3 is a diagram illustrating an example of the directory configuration of a medium.

FIG. 3 shows a directory when the first medium 10 is a ROM-type Blu-ray Disc (Registered Trademark), and specifically, shows a directory configuration corresponding to recorded data of a BD (Blu-ray Disc (Registered Trademark)).

As shown in FIG. 3, the directory is divided into a management information setting portion 51 (AACS directory) and a data portion 52 (BDMV directory).

The management information setting portion 51 (AACS directory) stores a CPS unit key file, a usage control information file, or the like.

The data portion 52 records files of, for example, an index file, a playlist file, a clip information file, a clip AV stream file, and a BDJO file below the BDMV directory.

The index file stores title information as index information which is applied to reproduction processing. The title is the same as the title registered in the unit key management table which has already been described with reference to FIG. 2 and is a data associated with a CPS unit.

The playlist file is a file defines a reproduction sequence or the like of contents depending on program information of a reproducing program designated by a title, and has specification information on clip information having reproduction position information.

The clip information file is a file which is designated by the playlist file, and has reproduction position information of a clip AV stream file or the like.

The clip AV stream file is a file which stores AV stream data to be reproduced.

The BDJO file is a file which stores a JAVA (Registered Trademark) program and execution control information of a file storing a command or the like.

A sequence in which an information processing apparatus reproduces a content recorded in an information recording medium is as follows.

First, a specific title is designated from an index file by a reproducing application.

A reproducing program associated with the designated title is selected.

A playlist which defines a content reproduction sequence or the like is selected in accordance with program information of the selected reproducing program.

An AV stream or a command as real content data is read by clip information defined in the selected playlist, and the AV stream is reproduced or the command is executed.

In the content reproduction processing, it becomes possible to distinguish between a unit and a unit key which have already been described with reference to FIG. 2, and a unit key corresponding to a unit to be reproduced is acquired, such that decryption processing in terms of units is performed. When the copy processing which has been described with reference to FIG. 1 is performed, the copy processing is performed while data to be copied is specified with reference to information received from the management server 50.

[3. Copy Processing Sequence of Contents Based on Server Management]

Figure 4:
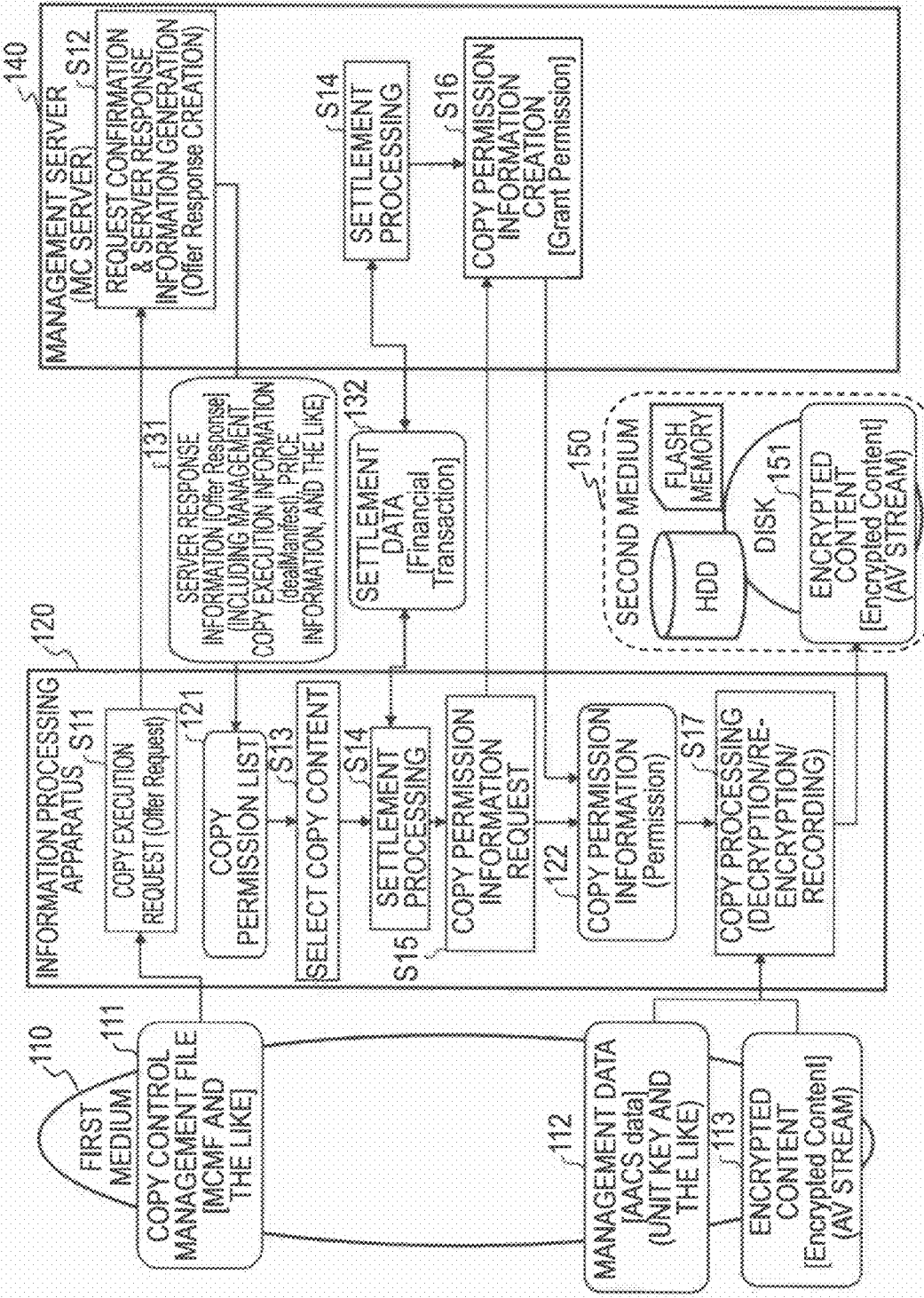
FIG. 4 is a diagram illustrating a sequence of copy processing (MC (Managed Copy)) under the management of a management server.

Next, a copy processing sequence of contents based on server management will be described with reference to FIG. 4 and later. FIG. 4 is a diagram illustrating a sequence of managed copy (MC) which is an example of the copy processing of contents based on server management.

FIG. 4 shows, from the left, a first medium 110, such as a ROM disc, which has recorded contents, an information processing apparatus 120 serving as a user apparatus which reads data, such as contents, from the first medium 110 and performs copy processing, a second medium 150 which is a medium as a content copy destination, and is constituted by a hard disc (HDD), a flash memory, an R/RE disc, or the like, and a management server (MC server) 140 which performs processing for providing content copy permission information or the like.

The information processing apparatus 120 is constituted by, for example, a PC, a recording/reproducing apparatus, or the like, and performs processing for receiving data read from the first medium 110 and recording data in the second medium 150 serving as a copy destination medium, which is constituted by a hard disc (HDD), a flash memory, an R/RE disc, or the like, that is, content copy processing.

The first medium 110 is, for example, a ROM-type Blu-ray Disc (Registered Trademark), a DVD disc, or the like. The second medium 150 is a medium in which data can be written. Specifically, the second medium 150 is, for example, a hard disc (HDD), a flash memory, an R or an RE-type Blu-ray Disc (Registered Trademark), a DVD disc, or the like.

For example, as shown in the drawing, the first medium 110 which is constituted by, for example, a ROM disc or the like records an encrypted content 113 which is a usage control content. The encrypted content 113 is a content which includes, for example, an AV (Audio Visual) stream, music data, a game program, an image file, audio data, text data, and the like of a motion image content, such as an HD (High Definition) movie content, which is high-definition motion image data.

As described above with reference to FIG. 2, the encrypted content 113 is an encrypted content which has a usage management configuration in terms of content management units (CPS units) and is encrypted using different unit keys (CPS unit keys) in terms of CPS units. That is, in order to realize different usage control on segmented data in terms of units, encryption is done using different keys (called CPS unit keys, unit keys, or title keys) on the units.

The first medium 110 stores key information which is applied in decrypting the encrypted content 113, management data (AACS Data) 112 which is constituted by usage control information or the like, and a copy control management file (MCMF: Managed Copy Manifest File) 111 which is used during copy processing of contents recorded in the first medium 110. The copy control management file (MCMF) will be described below.

Management data 112 as information recorded in the first medium 110 of FIG. 4 is, for example, management data which is defined by AACS (Advanced Access Content System) as the standard management system relating to the content copyright protection technique. Management data 112 includes a CPS unit key file which stores a key (unit key) applied in decrypting the encrypted content 113, usage permission information, a content certificate (CC) which represents integrity of a content, an encryption key block (MKB (Media Key Block)) which stores a medium key for acquiring a CPS unit key, and the like.

The MKB (Media Key Block) will be simply described. The MKB is an encryption key block which is generated on the basis of a key distribution method having a tree structure as an example of a broadcast encryption method. The MKB is a key information block which enables a medium key [Km] as a key necessary for decrypting a content to be acquired only through processing (decryption) based on a device key [Kd] stored in an information processing apparatus of a user having a valid license. In this case, an information distribution method based on a so-called hierarchical tree structure is applied, and only when a user device (information processing apparatus) has a valid license, the medium key [Km] can be acquired. In an invalidated (revoked) user device, the medium key [Km] cannot be acquired. The device key [Kd] is stored in the memory of the information processing apparatus 120 shown in FIG. 2.

The copy control management file (MCMF: Managed Copy Manifest File) 111 as information recorded in the first medium 110 of FIG. 4 is a file which is applied in performing copy processing the content 113 recorded in the first medium 110, and is, for example, XML description data including data shown in FIG. 5.

(1) management server URL: access information of the management server which provides copy permission information. This is access information to the management server 140 shown in FIG. 4.

(2) copy data information (dealManifest)

(2-1) playlist file name: the file name of a playlist to be copied.

(2-2) CPS unit key information: identification information of a CPS unit key which is applied to decryption processing of a content to be copied.

(2-3) copy unit identifier: unit identification information of a copy unit (MC unit) which represents a unit of copying of managed copy (MC).

(3) content ID: the identifier of a content to be copied. For example, an ISAN (International Standard Audiovisual Number) as content code information is used.

A processing sequence when the encrypted content 113 recorded in the first medium 110 which is, for example, a ROM disc is copied to another medium, such as the second medium 150, which is constituted by a hard disc, an R/RE disc, or the like will be described with reference to FIG. 4.

In Step S11, the information processing apparatus 120 first transmits a copy execution request (Offer Request) to the management server 140 using server information (URI or the like) which is recorded in the copy control management file (MCMF) 111 recorded in the first medium 110.

At this time, a content ID or the like corresponding to a content as a copy processing target is transmitted to the management server 140.

FIG. 6 shows an example of data included in the copy execution request. As shown in FIG. 6, the copy execution request includes, for example, the following data.

(a) content ID: the identifier of a content stored in the first medium (b) content certificate ID: a certificate for confirming the integrity of the content (c) medium identifier: the identifier of the first medium as a copy source (d) random number: data for data integrity confirmation (e) language code: code information of a language used by the information processing apparatus Of these, the information (a) to (c) are read from the first medium 110. The (d) random number is generated in the information processing apparatus 120. With regard to the (e) language code, a language code which has already been recorded in the memory of the information processing apparatus 120 is acquired and transmitted.

The language code is used to determine the language or the like of offer detail information included in a response provided by the management server 140.

Returning to FIG. 4, the content copy processing sequence based on server management will be continued. In Step S12, the management server 140 performs verification processing of the integrity or the like of received information, such as the content ID received from the information processing apparatus 120, when it is confirmed that there is no problem, generates server response information (Offer List) 131, and transmits the server response information (Offer List) 131 to the information processing apparatus 120.

Basic information which is included in the server response information (Offer List) 131 provided to the information processing apparatus 120 by the management server 140 will be described with reference to FIG. 7. Though described below in detail, in the processing configuration according the embodiment of the invention, information which is included in the server response information (Offer List) 131 includes additional information, which will be described with reference to FIG. 9 or the like, as well as the basic information shown in FIG. 7.

First, the basic information which is included in the server response information (Offer List) 131 will be described with reference to FIG. 7. The basic information includes the following information.

(1) offer detail information (1a) title/abstract/description (title/abstract/description) information on title, abstract, and description corresponding to a copy permitted content.

(1b) copy unit identifier (MCU): an identifier for identifying a copy unit as a unit of copying.

(1c) price information (price): price information for copying.

(1d) auxiliary price information (priceInfo): auxiliary information of price.

(1e) settlement server URL (financialHTMLURL): access information of a server which performs settlement of a fee for copying.

(1f) copy destination information (mcotInfo): information which represents the type or the like of a medium permitted as a copy destination apparatus. For example, the medium type, such as an HDD or a flash memory, is recorded.

(2) random number (mcmNonce): a random number for confirming data integrity.

(3) copy data information (File name to be copied) (=dealManifest)

(3a) playlist file name (PlayList file name): the file name of a playlist to be copied. With the specification of a playlist, a clip information file or a clip AV stream file can also be specified.

(3b) CPS unit key information (Index to identify the CPS Unit Key): identification information of a key (CPS unit key) for decrypting a copy content.

(3c) copy unit identifier (MCUi): identification information of a copy unit (MCU) representing a unit of copying.

(4) server public key certificate (MCScert): a certificate which stores the public key of the server for use in encrypted communication, signature confirmation, or the like.

(5) signature (signature): signature data for confirming falsification on all pieces of data.

These kinds of information are the basic information which is included in the server response information (Offer List) 131 provided to the information processing apparatus 120 by the management server 140. These kinds of information are set for each copy unit (MCU) as a unit of copy processing.

For example, even in the same content A, a copy unit is set in accordance with a copy destination medium. That is, the following settings are made.

copy unit 0001 of content A for hard disc copy unit 0002 of content A for flash memory The server response information (Offer List) 131 shown in FIG. 7 includes the same information as information recorded in the copy control management file (MCMF) 111 recorded in the first medium 110 described with reference to FIG. 5, that is, the (3) copy data information (File name to be copied) (=dealManifest). With regard to these kinds of information, copy processing is performed preferentially over received information from the management server 140. This is because the received information of the management server 140 is likely to be sequentially updated.

Returning to FIG. 4, the content copy processing sequence based on server management will be continued. In Step S12, the management server 140 performs verification processing of the integrity or the like of the received information, such as the content ID, received from the information processing apparatus 120, when it is confirmed that there is no problem, generates the server response information (Offer List) 131, and transmits the server response information (Offer List) 131 to the information processing apparatus 120.

In the processing configuration according to the embodiment of the invention, the server response information (Offer List) 131 includes additional information shown in FIG. 9, in addition to the basic information shown in FIG. 7. The additional information will be described below.

The information processing apparatus 120 which receives the server response information (Offer List) 131 displays a list of copy permitted contents (copy permission list 131) on a display unit of the information processing apparatus 120 using the server response information (Offer List) 131 received from the management server 140. In this list, for example, a price when each content is copied is set.

In Step S13, the user carries out content selection to designate a content to be copied or the like from the copy permitted content list. In Step S14, the information processing apparatus 120 performs settlement processing involved in copy processing to the management server 140. Specifically, transfer processing or the like of settlement data 132 is performed between the information processing apparatus 120 and the management server 140. A server which performs settlement processing may be a settlement server which is different from the management server. When a content in which copy processing is set free, the settlement processing is not performed.

After the settlement processing which is performed if necessary is completed, in Step S15, the information processing apparatus 120 transmits a request for copy permission information to the management server 140. In Step S16, the management server 140 confirms that settlement is done is response to the request for copy permission information from the information processing apparatus 120, generates copy permission information 122, and transmits the copy permission information 122 to the information processing apparatus 120.

In Step S17, the information processing apparatus 120 performs content copy processing under the condition that the copy permission information 122 is received from the management server 140. That is, the encrypted content 113 is read from the first medium 110, data to be copied is selected and encrypted, and data is copied to the second medium 150 as a copy destination which is constituted by a hard disc (HDD), a flash memory, an R/RE disc, or the like.

The content copy processing is performed, for example, in the following sequence.

(1) read an encrypted content from the first medium 110 (copy source medium), (2) decryption processing of an encrypted content according to a first management system corresponding to the first medium 110 (copy source medium), (3) encryption processing of a content according to a second management system corresponding the second medium 150 (copy destination medium), (4) recording processing of an encrypted content in the second medium 150 (copy destination medium), The processing is performed in such a sequence.

As described above, in reading an encrypted content from a disc and copying the encrypted content to a medium, such as another disc, processing is performed for temporarily decrypting the encrypted content to be copied, then re-encrypting the content according to the standard of the copyright management system corresponding to the copy destination medium, and recording the re-encrypted content. With this processing, usage control is made in the copy destination medium, preventing unauthorized use or distribution of copy contents.

The content copyright management system relating to digital data is collectively called a DRM (Digital Rights Management) system. There are many mediums in which digital data is recordable, and various DRM systems corresponding to the mediums are used. In copying digital data between mediums using different DRM systems, the DRM system which is used in the copy source medium is changed to the DRM system which is used in the copy destination medium, and then copying is carried out. With this configuration, it is possible to prevent unauthorized use or distribution of copy contents.

In this case, when the management system (referred to as first DRM) of the copy source is different from the content management system (referred to as second DRM) of the copy destination, it is necessary that, as in the sequence of (1) to (4) described above, the encrypted content of the copy source is temporarily decrypted and processed according to the management system (second DRM) of the copy destination. For example, the content should be re-encrypted using a different encryption key and recorded.

With regard to the decryption processing of the encrypted content according to the first management system in (2), when the first management system is a system based on the AACS standard, a CPS unit key is applied and decryption processing is performed in terms of CPS units.

The second management system corresponding to the copy destination medium (second medium 150) is AACS, and management systems corresponding to various standards, such as CPRM, MagicGate, and VCPS, based on mediums are supposed.

Figure 8:
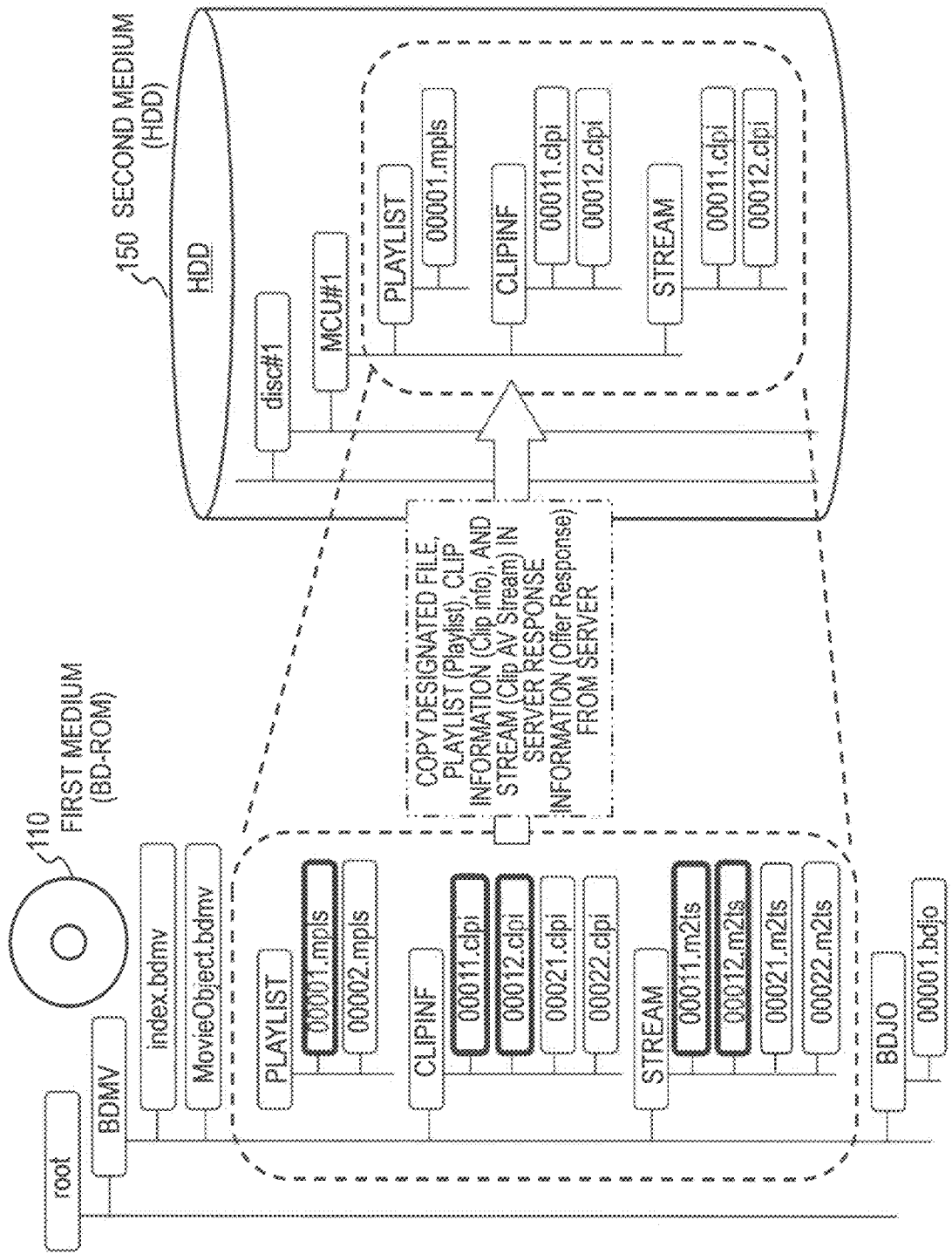
FIG. 8 is a diagram illustrating an example of copy processing from a first medium 110 as a copy source to a second medium 150 (hard disc (HDD)) as a copy destination.

FIG. 8 shows an example of specific copying. FIG. 8 shows the first medium 110 as a copy source and a hard disc (HDD) which is an example of the second medium 150 as a copy destination.

As shown on the left of FIG. 8, the first medium 110 records various files in accordance with the directory configuration which has been described above with reference to FIG. 3. A specific file is selected from among these files, and processing is performed for copying only the selected file to the hard disc (HDD) as the second medium 150.

An example is described where a file indicated by a bold line from the directory of the first medium 110 shown on the left of FIG. 8 is selected and copied. That is, the following files are selected and copied.

playlist file (PLAYLIST): 00001.mpls, clip information file (CLIPINF): 00011.clpi, 00012.clpi AV stream file: 0011.m2ts, 0012m2ts As described above, during the copy processing, a management information file, such as an index file or a movie object file, is not copied, and only the playlist file to the AV stream file are recorded.

File selection is carried out using information included in the server response information (Offer List) 131 which has been described above with reference to FIG. 7.

As described above with reference to FIG. 7, the server response information (Offer List) 131 records the following information as the (3) copy data information (File name to be copied) (=dealManifest).

(3a) playlist file name
(3b) CPS unit key information
(3c) copy unit identifier (MCUi)

A copy unit as a unit of copying is selected using these kinds of information, and a playlist file name corresponding to the selected copy unit is acquired to acquire a playlist file. A clip information file or a clip AV stream file which is designated by the acquired playlist file is acquired. A CPS unit key corresponding to the copy unit is acquired to decrypt a content, such as the clip AV stream file. Thereafter, encryption processing or the like corresponding to the DRM system of the second medium 150 is performed, and a file is set in the hard disc (HDD) as the second medium 150.

[4. Additional Information which is Recorded in Server Response Information Provided from Management Server]

Next, server response information which is one of the features of the invention will be described. As described above with reference to FIGS. 4 and 7, the management server 140 generates the server response information (Offer Response) 131 as the response to the copy execution request (Offer Request) from the information processing apparatus 120 which performs content copy processing and provides the server response information (Offer Response) 131 to the information processing apparatus 120.

The server response information (Offer Response) 131 includes the basic information described with reference to FIG. 7. In the configuration according to the embodiment of the invention, the management server 140 generates the server response information (Offer Response) 131 including the additional information shown in FIG. 9, in addition to the basic information shown in FIG. 7, and provides the server response information (Offer Response) 131 to the information processing apparatus 120.

The additional information shown in FIG. 9 will be described. The additional information includes the following information.

(1) first copy restriction information
(1a) region restriction information (region)
(1b) age restriction information (age)
(1c) three-dimensional image (3D) restriction information
(2) second copy restriction information
selection restriction information (selection) [audio (audio)/subtitle (subtitle)/angle (angle)+angle information (angleInfo)]
(3) playlist sequence information These kinds of information are set as information corresponding to a copy unit (MCU) set as a unit of copying.

These kinds of information will be described.

(4-1. Region Restriction Information (Region))

The region restriction information (region) is restriction information relating to a region (for example, country or a collection of countries) where copying is permitted. For example, the regions in the world are divided into A, B, C, . . . in advance, and the information is set such that copying is permitted only in the information processing apparatuses of the regions A and B.

The information processing apparatus 120 which performs copy processing compares the region restriction information (region) received from the management server 140 and a region code or a language code stored in the internal memory of the information processing apparatus 120. The information processing apparatus 120 determines whether or not the code stored in the information processing apparatus 120 is the code of a region where copying is permitted in the region restriction information (region) received from the management server 140. Only when it is determined that the code stored in the information processing apparatus 120 corresponds to a copy permission region, the information processing apparatus 120 performs the copy processing. When it is determined that the code stored in the information processing apparatus does not correspond to the copy permission region, the information processing apparatus 120 does not perform the copy processing.

The information processing apparatus 120 is provided with a nonvolatile memory which stores a region code representing a sales region or a language code representing a language to be used in advance in accordance with the sales region (for example, country or the like).

Figure 11:
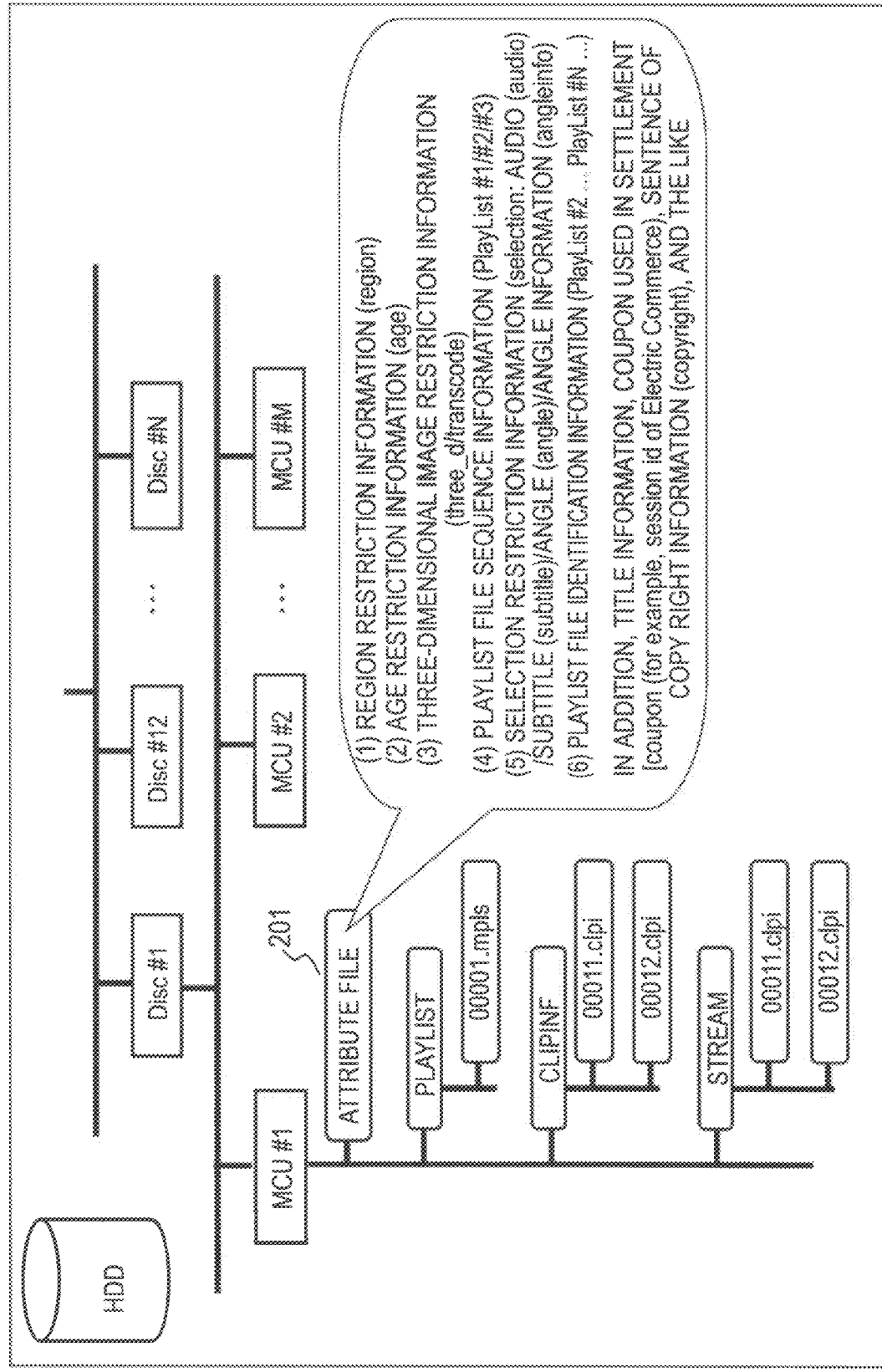
FIG. 11 is a diagram illustrating a recording example of a specific attribute file in a second medium 150.

For example, when the copy destination medium is a medium, such as a hard disc (HDD), in which reproduction is permitted in the same sequence as the BD-ROM reproduction sequence, the information processing apparatus 120 performs processing for creating an attribute file storing the additional information shown in FIG. 9 and recording the attribute file in the copy destination medium (see FIG. 11). The attribute file recording processing is performed, such that, in reproducing a copy content from the copy destination medium, content reproduction restriction can be made using various kinds of information recorded in the attribute file. That is, content reproduction restriction can be made in accordance with the region restriction information (region). The details of this processing will be described.

When the copy destination medium is a medium, such as a hard disc (HDD), in which reproduction is possible in the same sequence as the BD-ROM reproduction sequence, and setting is made such that content reproduction control can be performed using various kinds of information recorded in the attribute file, instead of determining the possibility of the copy processing according to the region restriction information (region), copying of all kinds of data may be performed, and content reproduction restriction may be made using the region restriction information (region) recorded in the attribute file at the time of reproduction.

Programs for copying possibility determination processing based on the region restriction information (region) at the time of copy processing, copy processing accompanied by attribute file recording, copy content reproduction processing, and the like are provided in the information processing apparatus 120 in advance. A specific processing sequence will be described below with reference to a flowchart.

In performing copy processing and reproducing a copy content, processing according to these programs is performed. Various settings may be provided such that these programs may be recorded in advance in a nonvolatile memory of the information processing apparatus 120, may be provided from the first medium 110, or may be provided from the management server 140.

(4-2. Age Restriction Information (Age))

The age restriction information (age) is information which restricts the age (for example, 13 or older, 18 or order, or the like) at which copying is permitted. For example, a usage is possible such that, with regard to a movie content including a scene of violence or the like, copying is performed only for a user who is 13 or older.

The information processing apparatus 120 can set the age restriction information in advance in the internal memory. For example, a parental lock function which is known in the related art may be used. The parental lock provided a function of comparing the age restriction information recorded as content management information at the time of content reproduction with the age restriction information set in the memory of the information processing apparatus 120, and when the age restriction information set in the memory of the information processing apparatus 120 is less than the age restriction information recorded as content attribute information, causing content reproduction to be not carried out.

However, this function is executed, for example, when management information recorded in a disc is read in reproducing a content recorded in the disc, and comparison processing is performed for comparing the management information with parental lock setting information set in the information processing apparatus 120. That is, the function is effectively executed in reproducing a content from a ROM medium having recorded management information and contents.

However, as described above with reference to FIG. 8, at the time of the content copy processing, the management information recorded in the disc is not referenced or the copy processing is not performed, and only the playlist file to the AV stream file are selected and copied. Thus, in an apparatus having a parental lock function, when the copy processing is performed, the setting of parental lock of the information processing apparatus 120 may be neglected, and even a child may copy all contents. In reproducing a content of the copy destination, the age restriction information does not exist in the copy destination, and reproduction can be done while age restriction is neglected.

According to the embodiment of the invention, in order to prevent such a situation, determination processing is performed for determining copying possibility based on the age restriction information (age) from the management server 140 as the condition for the copy processing.

That is, the information processing apparatus 120 which performs the copy processing compares the age restriction information (age) received from the management server 140 with age restriction information (age) (for example, parental lock setting information) stored in the internal memory of the information processing apparatus 120. The information processing apparatus 120 performs the copy processing only when it is determined that the age setting for copy permission of the information processing apparatus 120 is the age at which copying is permitted in the age restriction information (age) received from the management server 140. When it is determined that the setting of the information processing apparatus is not the age at which copying is permitted in the age restriction information (age), the copy processing is not performed.

For example, when the copy destination medium is a medium, such as a hard disc (HDD), in which reproduction is permitted in the same sequence as the BD-ROM reproduction sequence, an attribute file storing the additional information shown in FIG. 9 is created and recorded in the copy destination medium (see FIG. 11). With this processing, in reproducing a copy content from the copy destination medium, content reproduction restriction can be made using the age restriction information recorded in the attribute file. The details of the processing will be described below.

When the copy destination medium is a medium, such as a hard disc (HDD), in which reproduction is possible in the same sequence as the BD-ROM reproduction sequence, and content reproduction restriction can be made using various information recorded in the attribute file, instead of determining the possibility of the copy processing based on the age restriction information (age), copying of all kinds of data may be permitted, and the copy processing may be performed. At the time of reproduction, content reproduction restriction may be made using the age restriction information (age) recorded in the attribute file.

Programs for copying possibility determination processing at the time of copy processing, copy processing accompanied by attribute file recording, copy content reproduction processing, and the like are provided in the information processing apparatus 120 in advance. A specific processing sequence will be described below with reference to a flowchart.

(4-3. Three-Dimensional Image (3D) Restriction Information)

The three-dimensional image (3D) restriction information is copy restriction information when three-dimensional image (3D) data is included in a content to be copied. Specifically, three kinds of restriction information are set in accordance with 3D contents.

(p1) To inhibit conversion from 3D to 2D and copying
(p2) To permit conversion from 3D to 2D and copying, but to inhibit 2D reproduction
(p3) To permit conversion from 3D to 2D and copying, and to permit 2D reproduction Two kinds of restriction information are set in accordance with 3D contents.

(q1) To permit conversion to different 3D format and copying
(q2) To inhibit conversion to different 3D format and copying The information processing apparatus 120 or a display device connected to the information processing apparatus 120 is largely divided into two causes of when the apparatus can reproduce a three-dimensional image and when the apparatus can reproduce only a two-dimensional image.

When the information processing apparatus 120 or a display device connected to the information processing apparatus 120 is an apparatus which can reproduce a three-dimensional image, it is supposed that there is practically a case where reproduction display is possible in a specific three-dimensional image format.

The three-dimensional image (3D) restriction information sets restriction information in copying a three-dimensional image in various apparatuses.

For example, when the information processing apparatus 120 or a display device connected to the information processing apparatus 120 is an apparatus which can reproduce only a two-dimensional image, in performing the copy processing on the hard disc of the information processing apparatus 120, it should suffice that copying as a 2D image is performed.

However, a content producer may not want the user to carry out reproduction as a 2D image. In such a case, the settings (p1) and (p2) are made. That is, the following settings are made.

(p1) To inhibit conversion from 3D to 2D and copying
(p2) To permit conversion from 3D to 2D and copying, but to inhibit 2D reproduction With these settings, it becomes possible to permit content copying or reproduction only in the form of a 3D content.

The following settings are possible as the three-dimensional image (3D) restriction information.

(q1) To permit conversion to different 3D format and copying
(q2) To inhibit conversion to different 3D format and copying The two kinds of restriction information are set in accordance with 3D contents.

As the format of a 3D image, for example, the following representative methods are known.

Frame Sequential method,
Side by Side method, and
Top & Bottom method

The Frame Sequential method is an encoding method in which the frames of a left-eye image (L image) and a right-eye image (R image) are alternately recorded/transferred in order of L, R, L, R, . . . .

The Side by Side method is an encoding method in which an LR image is divided left and right in one frame image and recorded/transferred.

The Top & Bottom method is an encoding method in which an LR image is divided up and down in one frame image and recorded/transferred.

At present, various methods are mixedly used.

Even when the information processing apparatus 120 or a display device connected to the information processing apparatus 120 is an apparatus which can reproduce a three-dimensional image, it is supposed that there is practically a case where reproduction display is possible in accordance with any one format of the three-dimensional image formats.

In copying, there is a case where it is necessary to carry out conversion to a reproducible format in the information processing apparatus 120 or a display device connected to the information processing apparatus 120. However, if such format conversion is carried out, quality as a 3D image may be deteriorated. The content producer does not want quality degradation. In this case, the following setting is made.

(q2) To inhibit conversion to different 3D format and copying

At the time of copy processing of a 3D content, the information processing apparatus 120 which performs the copy processing references the three-dimensional image (3D) restriction information received from the management server 140, that is, the following information and copies a 3D content in accordance with the restriction information.

(p1) To inhibit conversion from 3D to 2D and copying (p2) To permit conversion from 3D to 2D and copying, but to inhibit 2D reproduction (p3) To permit conversion from 3D to 2D and copying, and to permit 2D reproduction (q1) To permit conversion to different 3D format and copying (q2) To inhibit conversion to different 3D format and copying When the copy destination medium is a medium, such as a hard disc (HDD), in which reproduction is permitted in the same sequence as the BD-ROM reproduction sequence, an attribute file storing the additional information shown in FIG. 9 is created and recorded in the copy destination medium (see FIG. 11). With this processing, in reproducing a copy content from the copy destination medium, content reproduction restriction can be made using the three-dimensional image (3D) restriction information recorded in the attribute file. The details of this processing will be described.

When the copy destination medium is a medium, such as a hard disc (HDD), in which reproduction is possible in the same sequence as the BD-ROM reproduction sequence, and setting is made such that content reproduction control can be performed using various kinds of information recorded in the attribute file, instead of determining the possibility of the copy processing according to the three-dimensional image (3D) restriction information, copying of all kinds of data may be permitted, and the copy processing may be performed. At the time of reproduction, content reproduction restriction may be made using the three-dimensional image (3D) restriction information recorded in the attribute file.

Programs for copying possibility determination processing at the time of copy processing, copy processing accompanied by attribute file recording, copy content reproduction processing, and the like are provided in the information processing apparatus 120 in advance. A specific processing sequence will be described below with reference to a flowchart.

(4-4. Selection Restriction Information (Selection))

Next, selection restriction information (selection) which is the second copy restriction information will be described. The selection restriction information is information which restricts the setting of the following information on a copy content.

(a) Audio
(b) Subtitle
(c) Angle (a) Audio is restriction information of audio, such as Japanese audio, English audio, or French audio, which is reproduced in accordance with, for example, a movie content, and is information which restricts audio data permitted as a copy content.

Specifically, an attribute value is set as audio with copy permission, and any one of the attribute values, for example, audio attribute value=−1 (undesignated), 1 (JPN (Japanese)), 2 (ENG (English)), 3 . . . is set.

For example, when the audio attribute value=−1 (undesignated), the user can freely select audio. When the audio attribute value=2 (JPN (Japanese)), only a content with Japanese audio set becomes a copy permitted content.

(b) Subtitle is restriction information of subtitle, such as Japanese subtitle, English subtitle, or French subtitle, which is displayed in accordance with, for example, a movie content, and is information which restricts subtitle data permitted as a copy content.

Specifically, an attribute value is set as subtitle with copy permission, and any one of the attribute values, for example, subtitle attribute value=−1 (undesignated), 1 (ENG (English)), 2 (JPN (Japanese)), 3 . . . is set.

For example, when the subtitle attribute value=−1 (undesignated), the user can freely select subtitle. When the subtitle attribute value=2 (JPN (Japanese)), only a content with Japanese subtitle set becomes a copy permitted content.

(c) Angle is information which restricts an angle image with copy permission. Specifically, for example, in music video contents or the like, there is a content in which a plurality of images focused on a specific member from among a plurality of members (for example, members x, y, and z) constituting a musician are set.

For example, there is a content in which a plurality of angle images described below are set.

angle attribute value=1: a captured image focused on the member x angle attribute value=2: a captured image focused on the member y angle attribute value=3: a captured image focused on the member z angle attribute value=4: a captured image focused on all the members x to z A setting can be made such that copying is permitted on a content corresponding to a specific angle from the content, or a setting can be made such that selection is carried out in accordance with a user's preference.

For example, when the angle attribute value=−1 (undesignated), the user can freely select an angle. When the angle attribute value=2 (a captured image focused on the member y), only an angle 2 (a captured image focused on the member y) becomes a copy permitted content.

The angle information (angleInfo) is description information relating to an angle image corresponding to the angle attribute value=1, 2, . . . . These are presented in a list which is displayed on the user apparatus so as to select a copy content. A specific example will be described.

The setting of each attribute value of specific selection restriction information (selection) is as follows.

selection restriction information of content A=(audio, subtitle, angle)=(1,2,1)

selection restriction information of content B=(audio, subtitle, angle)=(2,2,1)

selection restriction information of content C=(audio, subtitle, angle)=(−1,−1,2)

For example, the content A is a content having the settings of the audio attribute value=1 (ENG (English)), the subtitle attribute value=2 (JPN (Japanese)), and the angle attribute value=1 (a captured image focused on the member x). When the content A is selected, copying of the set content is carried out.

For example, the content B is a content having the settings of the audio attribute value=2 (JPN (Japanese)), the subtitle attribute value=2 (JPN (Japanese)), and the angle attribute value=1 (a captured image focused on the member x). When the content B is selected, copying of the set content is carried out.

For example, the content C is a content having the settings of the audio attribute value=−1 (undesignated), the subtitle attribute value=−1 (undesignated), and the angle attribute value=2 (a captured image focused on the member y). When the content C is selected, the user can freely select audio and subtitle, and copying of a content with only an angle preset is carried out.

During the content copy processing, the information processing apparatus 120 references the selection restriction information (selection) received from the management server 140 and performs the copy processing for copying a content corresponding to the setting of the selection restriction information (selection) as a copy permitted content. Copying of a content which departs from the setting of the selection restriction information (selection) is not permitted.

However, the information processing apparatus 120 can selectively perform the following processing in accordance with the copy destination medium.

(Processing 1)

Processing is performed for selectively copying only data corresponding to the setting of the selection restriction information (selection), such that a content which is reproducible from the copy destination medium includes only data corresponding to the setting of the selection restriction information (selection).

(Processing 2)

Data corresponding to and data departing from the setting of the selection restriction information (selection) are collectively copied, and an attribute file having recorded the selection restriction information (selection) is generated and recorded in the copy destination medium. In reproducing a content from the copy destination medium, reproduction is carried out in accordance with the selection restriction information (selection) of the attribute file, and a reproducible content includes only data corresponding to the setting of the selection restriction information (selection).

Any one of the settings can be made.

For example, when the copy destination medium is a medium, such as a hard disc (HDD), in which reproduction is permitted in the same sequence as the BD-ROM reproduction sequence, the copy processing and the reproduction processing of the (processing 2) can be performed.

When the copy destination medium is a medium, such as a flash memory, in which reproduction is permitted in the same sequence as the BD-ROM reproduction sequence, reproduction accompanied by attribute file reference processing is impossible, and the copy processing and the reproduction processing of the (processing 1) are performed.

Even when the copy destination medium is a medium, such as a hard disc (HDD), in which reproduction is permitted in the same sequence as the BD-ROM reproduction sequence, in order to reduce the capacity of copy data, a setting may be made such that the copy processing of the (processing 1) is performed, and only selected data is copied.

(4-5. Playlist Sequence Information)

Next, the playlist sequence information will be described. The playlist sequence information is information in which the sequence of a playlist for use in reproducing a copy content is defined.

As described above with reference to FIG. 8, during the content copy processing, copying of a movie object (MovieObject) file recorded in a disc is not carried out, and only the playlist file to the AV stream file are selected and copied. The movie object (MovieObject) file records the use sequence of a playlist at the time of content reproduction. At the time of content reproduction using the first medium 110, a playlist is sequentially acquired in accordance with playlist registration information of the movie object (MovieObject) file, and reproduction processing can be performed using a clip information file and an AV stream file which are selected in accordance with the acquired playlist.

However, in the copy destination medium to which a content is copied, there is no movie object (MovieObject) file. Thus, it may be impossible to determine the sequence of a playlist which is applied at the time of reproduction. If this information is not provided, processing is performed such that reproduction is simply carried out in accordance with the file name of the playlist. Even when this processing is performed, there is a content which can be correctly reproduced. Meanwhile, for example, in a content or the like in which the above-described angle is selected, it may be essential to select a specific playlist. The same is applied to audio, subtitle, or the like. In order to carry out reproduction using specific audio or subtitle, it is necessary to select and reproduce a specific playlist.

Content reproduction processing using a playlist will be described with reference to FIG. 10. FIG. 10 shows an example of content reproduction processing using a playlist #1.

In the playlist #1, a play item having reproduction designation information of an image content and a sub path having reproduction designation information of subtitle are set. The play item is constituted by two play items.

There are a first play item having a reproduction start point (IN1) and a reproduction end point (OUT1) of an opening image, and a second play item having a reproduction start point (IN2) and a reproduction end point (OUT2) of a feature presentation.

A sub path is constituted as information having a reproduction start point (IN3) and a reproduction end point (OUTS) of subtitle data.

For example, when subtitle data designated by a sub path is Japanese subtitle, Japanese subtitle is displayed in a reproducing content of the playlist #1.

In displaying English subtitle, a different playlist is used.

As described above, if different pieces of data are reproduced, it is necessary to select different playlists and to carry out reproduction.

As described above, the playlist sequence information is information which defines the sequence of playlist file names to be selected at the time of content reproduction. For example, the playlist sequence information is setting information of the use sequence of playlists described below.

playlist #3→playlist #5→playlist #8 . . . .

At the time of the content copy processing, the information processing apparatus 120 generates an attribute file storing the playlist sequence information and records the attribute file in the copy destination medium. In reproducing a content from the copy destination medium, the playlist sequence information of the attribute file is read, and a playlist is selected in accordance with the playlist sequence information to carry out reproduction, making it possible to perform correct reproduction processing.

[5. Example where Attribute File Storing Additional Information Relating to Copy Restriction Provided from Management Server is Generated and Recorded in Copy Destination Medium]

Next, an example will be described where an attribute file which stores additional information relating to copy restriction provided by the management server is generated and recorded in the copy destination medium.

For example, when the copy destination medium is a hard disc (HDD) or the like, it becomes possible to carry out reproduction in the same sequence as the BD-ROM reproduction sequence. In performing copy processing on this medium, if an attribute file which stores the additional information shown in FIG. 9 is recorded in the copy destination medium, at the time of the copy content reproduction processing, content reproduction control based on the additional information can be performed with reference to the additional information.

That is, in performing copy processing on the second medium 150, such as a hard disc (HDD), in which reproduction is possible in the same sequence as the BD-ROM reproduction sequence, the playlist file, the clip information file, and the AV stream file recorded in the first medium 110 may be collectively copied, and an attribute file which stores the additional information shown in FIG. 9 may be generated and recorded.

With this copy processing, in reproducing a copy content from the second medium 150, it becomes possible to acquire the additional information shown in FIG. 9 from the attribute file and to select and reproduce only a content according to each piece of restriction information. It is also possible to acquire the playlist sequence information included in the additional information shown in FIG. 9 to carry out content reproduction according to the correct playlist setting sequence.

FIG. 11 shows an example where a specific attribute file is recorded in the second medium 150. FIG. 11 shows an example where the second medium 150 as the copy destination is a hard disc, a playlist file, a clip information file, an AV stream file, and copy files thereof are set in the hard disc, and an attribute file 201 including the additional information shown in FIG. 9 is set.

As shown in FIG. 11, the directory of the second medium 150 is set in terms of copy units (MCUs). As described above, the additional information shown in FIG. 9 is generated by the management server 140 in terms of copy units (MCUs) and provided to the information processing apparatus 120.

Although in FIG. 11, the detail configuration of the directory of a copy unit #1 (MCU #1) is shown, the attribute file corresponding to the same copy unit is recorded in the directory of each of a copy unit #2 (MCU #2) and a copy unit #3 (MCU #3) shown in FIG. 11.

As shown in FIG. 11, the attribute file 201 stores, for example, the following information.

(1) Region restriction information (region)
(2) Age restriction information (age)
(3) Three-dimensional image restriction information (three_d/transcode)
(4) playlist file sequence information (PlayList #1/#2/#3)
(5) Selection restriction information (selection: audio (audio)/subtitle (subtitle)/angle (angle)+angle information (angleInfo)
(6) playlist file identification information (PlayList #2 . . . . PlayList #N . . . )

In addition, title information, a coupon [coupon (Electric Commerce session id) used for settlement, the sentence of copy right information (copyright), or the like may be recorded.

These kinds of information are created on the basis of the additional information provided by the management server 140 described above with reference to FIG. 9 or the basic information described with reference to FIG. 7.

An attribute file including these kinds of information is recorded in the copy destination medium and referenced in reproducing a copy content, such that only a content according to the restriction set by the management server is reproduced.

As described above, a program which defines recording apparatus of an attribute file during copying or a reproduction processing sequence using the attribute file in reproducing a copy content is provided in the information processing apparatus 120 in advance. The information processing apparatus 120 performs content copy processing or reproduction processing according to the program. A specific sequence of the processing will be described below with reference to a flowchart.

[6. Specific Example and Display Example of Server Response Information (Offer Response) Provided from Management Server]

Next, a specific example and a display example of the server response information (Offer Response) provided from management server will be described.

As described above with reference to FIG. 4 or the like, the management server 140 generates the server response information (Offer Response) 131 in accordance with the copy execution request of the information processing apparatus 120 and provides the server response information (Offer Response) 131 to the information processing apparatus 120.

The server response information (Offer Response) 131 is information which includes the following information.

(A) basic information described with reference to FIG. 7
(B) additional information described with reference to FIG. 9

The information processing apparatus 120 receives the server response information (Offer Response) 131 including the (A) basic information and the (B) additional information, and displays a list of contents permitted to be copied or detail information of contents on the display unit of the information processing apparatus 120. The user can determine a content to be copied in accordance with the displayed information.

A specific example and a display example of the server response information (Offer Response) provided by the management server will be described with reference to FIGS. 12 to 17.

The management server 140 generates the server response information (Offer Response) 131, for example, as XML data and provides the server response information (Offer Response) 131 to the information processing apparatus 120.

A data example of a portion of XML data will be described with reference to FIGS. 12 and 13.

Figure 12:
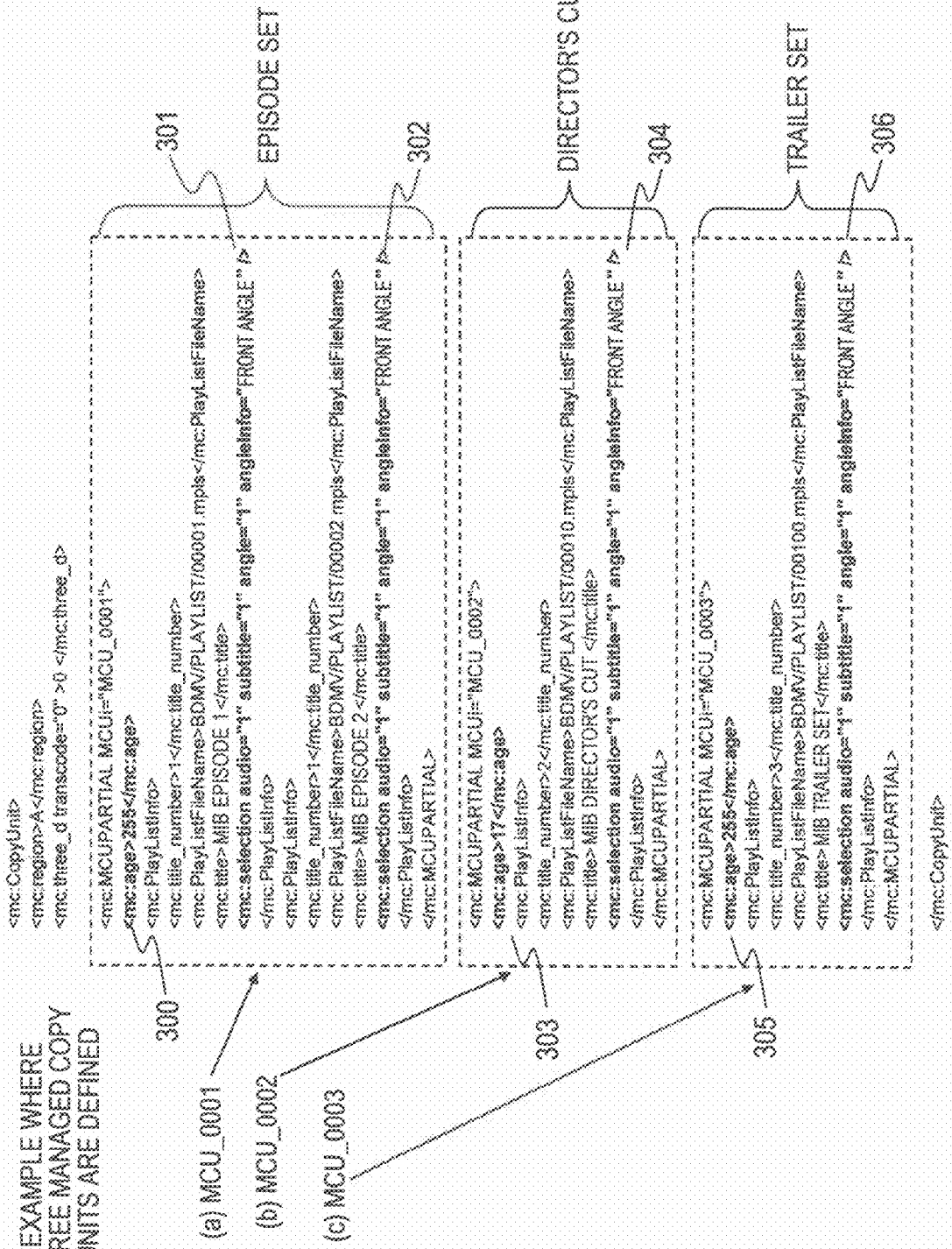
FIG. 12 is a diagram illustrating a specific example of server response information (Offer Response) which is provided from a management server.
Figure 13:
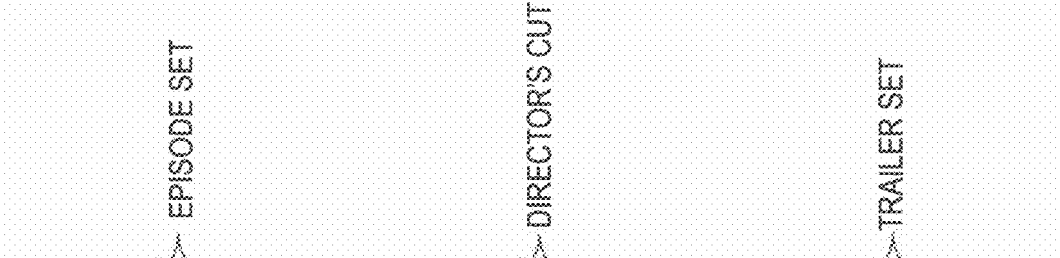
FIG. 13 is a diagram illustrating a specific example of server response information (Offer Response) which is provided from a management server.

FIGS. 12 and 13 show partial data of server response information corresponding to three copy units as three units of copying.

(a) copy unit [MCU_0001]: episode set
(b) copy unit [MCU_0002]: director's cut
(c) copy unit [MCU_0003]: trailer set There are three copy units described above.

The management server 140 generates the server response information (Offer Response) 131 in terms of copy units and provides the server response information (Offer Response) 131 to the information processing apparatus 120.

FIG. 12 shows XML data which represents a main portion of the basic information and the additional information included in the server response information (Offer Response) 131.

FIG. 13 shows XML data which is applied to display processing of a content list for display on the user apparatus included in the server response information (Offer Response) 131.

XML data shown in FIGS. 12 and 13 represents partial data of the server response information (Offer Response).

XML data shown in FIG. 12 will be described.

(a) copy unit [MCU_0001]: Data 300 in the episode set is set data of the age restriction information (age) in the additional information described with reference to FIG. 9. Data 301 and 302 are set data of the selection restriction information (selection) in the additional information described with reference to FIG. 9.

The set value of the age restriction information (age) of data 300 is "255". The value "255" represents no age restriction. That is, this means that copying is permitted for the users of all ages.

The selection restriction information (selection) represented by data 301 and 302 is information which restricts the setting of information below a copy content.

(a) Audio
(b) Subtitle
(c) Angle
(d) Angle information (angleInfo)

These set values are recorded.

When data corresponding to a plurality of titles is included in one copy unit, each piece of restriction information can be set to correspond to each title. (a) copy unit [MCU_0001] shown in FIG. 12 shows an example where two pieces of selection restriction information (selection) are set to correspond to each title.

When information processing apparatus performs copy processing, (1) Data to be copied is selected and copied in accordance with the selection restriction information (selection). That is, only data corresponding to selection restriction will be copied.

(2) Alternatively, all pieces of data are copied, and attribute file including selection restriction information is generated and recorded in the copy destination. When copying is carried out on an apparatus (for example, HDD) which can reproduce only data corresponding to selection restriction with reference to the attribute file at the time of reproduction, this processing may be performed.

Any one of the processing (1) and (2) is performed.

(b) copy unit [MCU_0002]: Data 303 in the director's cut is set data of the age restriction information (age) in the additional information described above with reference to FIG. 9. Data 304 is set data of the selection restriction information (selection).

The set value of the age restriction information (age) of data 303 is "17" and indicates that a user who is 17 or older is permitted to copy.

When copying is carried out in the information processing apparatus 120, the set value "17" of the age restriction information (age) is compared with the age restriction information (age) (for example, parental lock setting information) stored in the internal memory of the information processing apparatus 120. When the age restriction information (age) stored in the internal memory of the information processing apparatus 120 is "13" (for example, parental lock is set), it is determined that the setting of the information processing apparatus is not the age at which copying is permitted in the age restriction information (age), and copying is not carried out.

A configuration may be made such that copying itself can be carried out, and processing is performed for generating an attribute file including the age restriction information (age) and recording the attribute file in the copy destination. That is, when copying is carried out on an apparatus (for example, an HDD) which, at the time of reproduction, can acquire the age restriction information (age) with reference to the attribute file, compare the acquired age restriction information with the age restriction information (age) (for example, parental lock setting information) stored in the memory of the reproducing apparatus, and reproduce only data which is permitted to be reproduced, a setting may be made such that copying itself can be carried out.

(c) copy unit [MCU_0003]: Data 305 in the trailer set is set data of the age restriction information (age) in the additional information described above with reference to FIG. 9. Data 306 is set data of the selection restriction information (selection).

The set value of the age restriction information (age) of data 305 is "255". The value "255" represents no age restriction. That is, this means that copying is permitted for the users of all ages.

Next, XML data shown in FIG. 13 will be described. Data shown in FIG. 13 is XML data which is applied to display processing of a content list for display on the user apparatus included in the server response information (Offer Response) 131.

FIG. 13 also shows data corresponding three copy units.

(a) copy unit [MCU_0001]: episode set
(b) copy unit [MCU_0002]: director's cut
(c) copy unit [MCU_0003]: trailer set There are three copy units described above.

Figure 14:
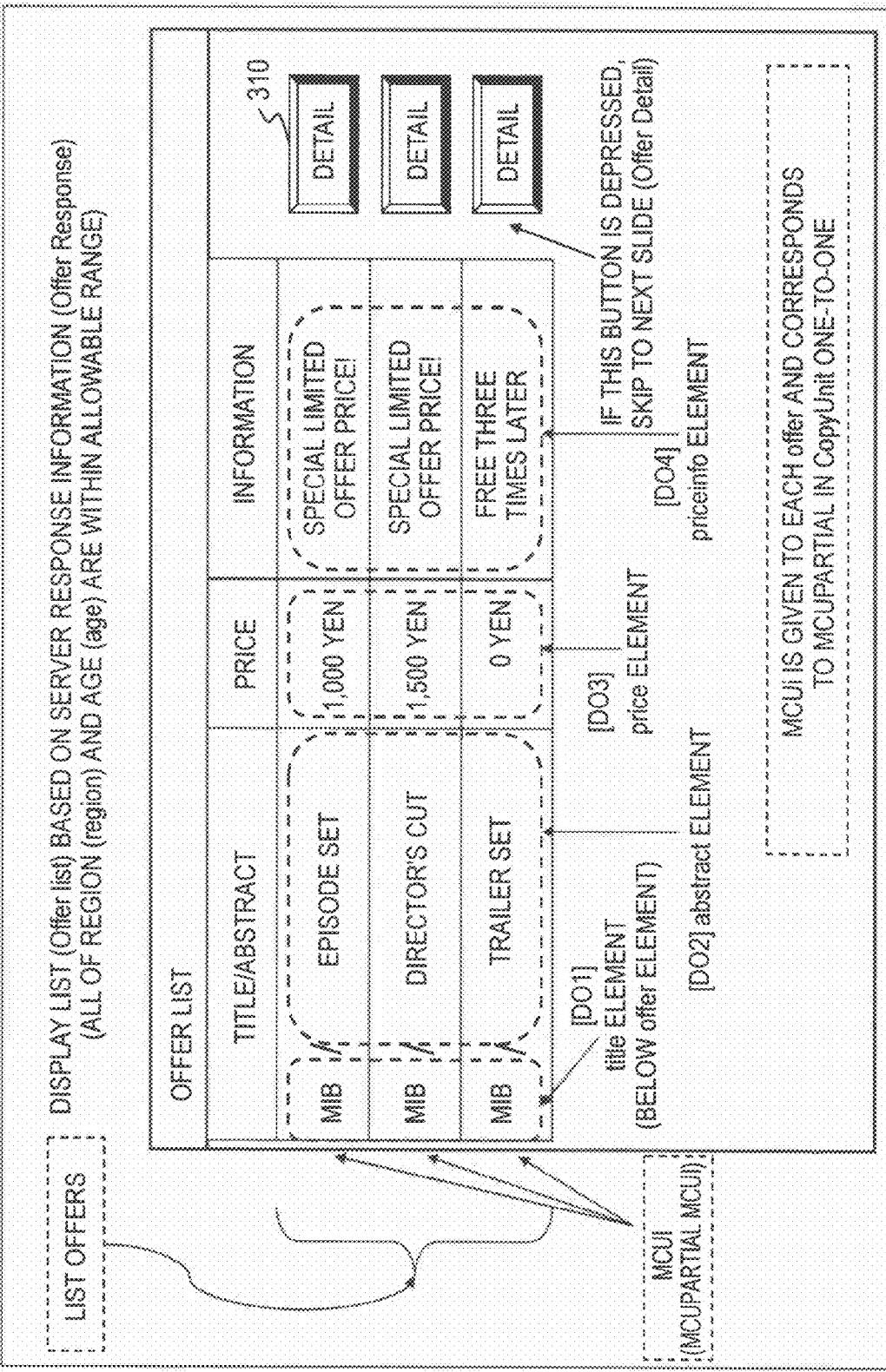
FIG. 14 is a diagram illustrating a display example of a content list based on server response information (Offer Response) which is provided from a management server.

FIG. 14 shows an example of display data which is displayed on the basis of XML shown in FIG. 13.

The information processing apparatus 120 performs processing for displaying a content list having data entries corresponding to copy units included in recorded data of the first medium on the display unit on the basis of received information from the management server 140. As shown in FIG. 14, each data entry is displayed as an entry which can be separately selected as a copy processing target.

(a) copy unit [MCU_0001]: Data [D01] to [D04] shown in episode set correspond to data portions [D01] to [D04] shown in FIG. 14. That is, the following data is displayed in accordance with XML data.

data [D01]=title
data [D02]=abstract
data [D03]=price
data [D04]=price information With regard to the (b) copy unit [MCU_0002] and (c) copy unit [MCU_0003], the same data is displayed as a content list on the display unit of the information processing apparatus 120 of the user in accordance with XML data.

The user selects a content desired to be copied from the list and performs settlement processing in accordance with the selection result. If the settlement processing ends, the copy permission information is received from the management server 140, and the copy processing is performed. This process is as described with reference to FIG. 4.

Figure 15:
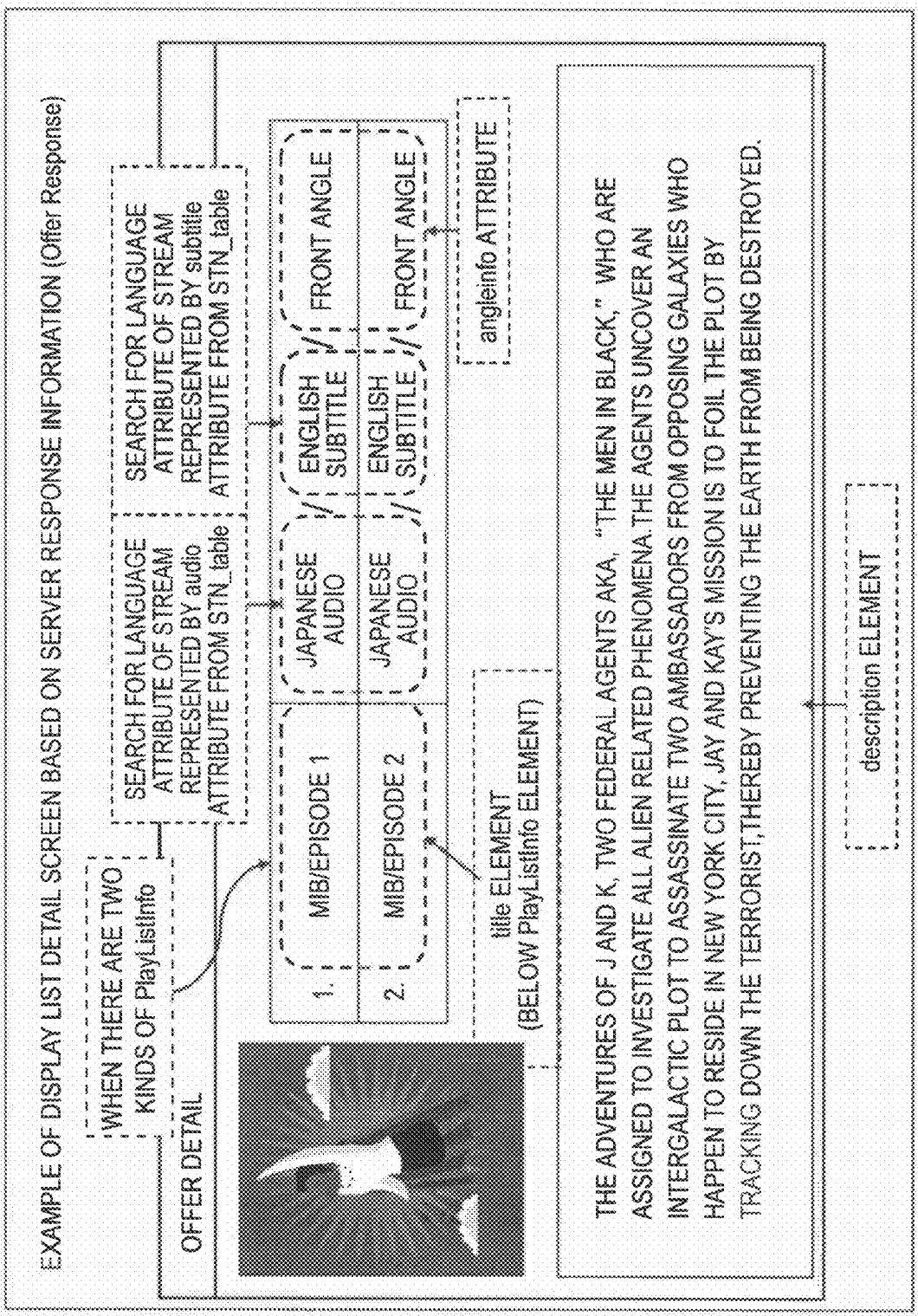
FIG. 15 is a diagram illustrating a display example of detailed information of contents based on server response information (Offer Response) which is provided from a management server.

The user operates a detail button 310 shown in FIG. 14 such that detail information corresponding to each entry can be displayed. FIG. 15 shows a display example of detail information. The detail information shown in FIG. 15 is generated on the basis of XML data described above with reference to FIGS. 12 and 13, that is, XML data which constitutes the server response information (Offer Response) provided by the management server 140.

Data shown in FIG. 15 is a display example of detail information corresponding to the (a) copy unit [MCU_0001]: episode set shown in FIGS. 12 and 13.

Selection restriction information shown in FIG. 15 is presented on the basis of the selection restriction information (selection) of data 301 and 302 described with reference to FIG. 12.

The selection restriction information corresponding to data 301 is displayed in the entry on the upper side (1. Episode 1) in the detail information shown in FIG. 15. That is, the following information is provided.
(a) Audio=Japanese audio
(b) Subtitle=English subtitle
(c) Angle information (angleInfo)=front angle The following setting information is recorded in XML data shown in FIG. 12.
audio attribute value=1,
subtitle attribute value=1,
angle attribute value=1,
attribute value of angle information (angleInfo)=front angle In generating display data shown in FIG. 15, with regard to angle, a setting is made such that display of the angle information is performed unchanged.

With regard to audio and subtitle, data (Japanese, English, or the like) having a specific meaning is acquired by search based on the attribute value set in XML data and displayed.

Corresponding data of the attribute value of audio or subtitle recorded in XML data and the specific meaning (language) is recorded in, for example, a STN table (STN table) or the like which is recorded as play item information in the playlist file. In generating display data shown in FIG. 15, the information processing apparatus can acquire a playlist file corresponding to a copy unit from the information recording medium (first medium), and can acquire and display specific language information of each attribute value recorded in XML data with reference to the STN table recorded in the acquired playlist file.

A configuration may be made such that the management server 140 generates server response information (Offer Response) in which language information is recorded in XML data along with the attribute value. In this case, the table search is not necessary.

The selection restriction information corresponding to data 302 shown in FIG. 12 is displayed in the entry on the lower side (2. Episode 2) of the detail information shown in FIG. 15. That is, the following information is provided.
(a) Audio=Japanese audio
(b) Subtitle=English subtitle
(c) Angle information (angleInfo)=front angle Detail description (description) is displayed on the lower side of FIG. 15. This information corresponds to data recorded in data [D05] shown in FIG. 13.

As described above, the list of copy permitted contents (FIG. 14) or detail information (FIG. 15) is presented to the user, such that the user can select a copy content after confirming the content.

However, a display example of the content list shown in FIG. 14 is a display example when there is no copy inhibited content in the following restriction information.
region restriction information (region)
age restriction information (age)

For example, when there is a copy inhibited content from among the contents recorded in the first medium 110 by the region restriction information (region) or the age restriction information (age), the information processing apparatus 120 is configured such that the copy inhibited content is not presented to the user as a content list. Alternatively, a copy permitted content and an unpermitted content are displayed in a distinct display form, such as a grayout display. That is, only a copy permitted data is in a selectively designatable display form and an unpermitted data is in a selectively non-designatable display form in accordance with the copy restriction information.

FIG. 16 shows a display example of a content list when region information recorded in the memory of the information processing apparatus 120 does not correspond to the copy permission region of the region restriction information (region) which is included in the server response information (Offer Response) 131 received from the management server 140.

When the region information stored in the memory of the information processing apparatus 120 corresponds to the copy permission region of the region restriction information (region) which is included in the server response information (Offer Response) 131 received from the management server 140, as shown in FIG. 14, a list of copy permitted contents is presented. However, when both do not correspond to each other, as shown in FIG. 16, a copyable content list is not presented, and a warning message (region is not identical) is displayed to notify the user that the region of the information processing apparatus is not identical.

At the time of display processing of a content list, the information processing apparatus 120 compares the region restriction information (region) received from the management server 140 with the region code or language code stored in the internal memory of the information processing apparatus 120. The information processing apparatus 120 determines whether or not the code stored in the information processing apparatus 120 is the code of a region where copying is permitted in the region restriction information (region) received from the management server 140.

As described above, the information processing apparatus 120 is provided with a nonvolatile memory which stores a region code representing a sales region or a language code representing a language to be used in advance in accordance with the sales region (for example, country or the like).

When the code stored in the information processing apparatus 120 is the code of a region where copying is permitted in the region restriction information (region) received from the management server 140, as shown in FIG. 14, the information processing apparatus 120 displays a content list with copy permission.

However, when the code stored in the information processing apparatus 120 is not the code of a region where copying is permitted in the region restriction information (region) received from the management server 140, as shown in FIG. 16, display of a content list is not performed. Alternatively, a copy permitted content and an unpermitted content are displayed in a distinct display form, such as a grayout display.

Figure 17:
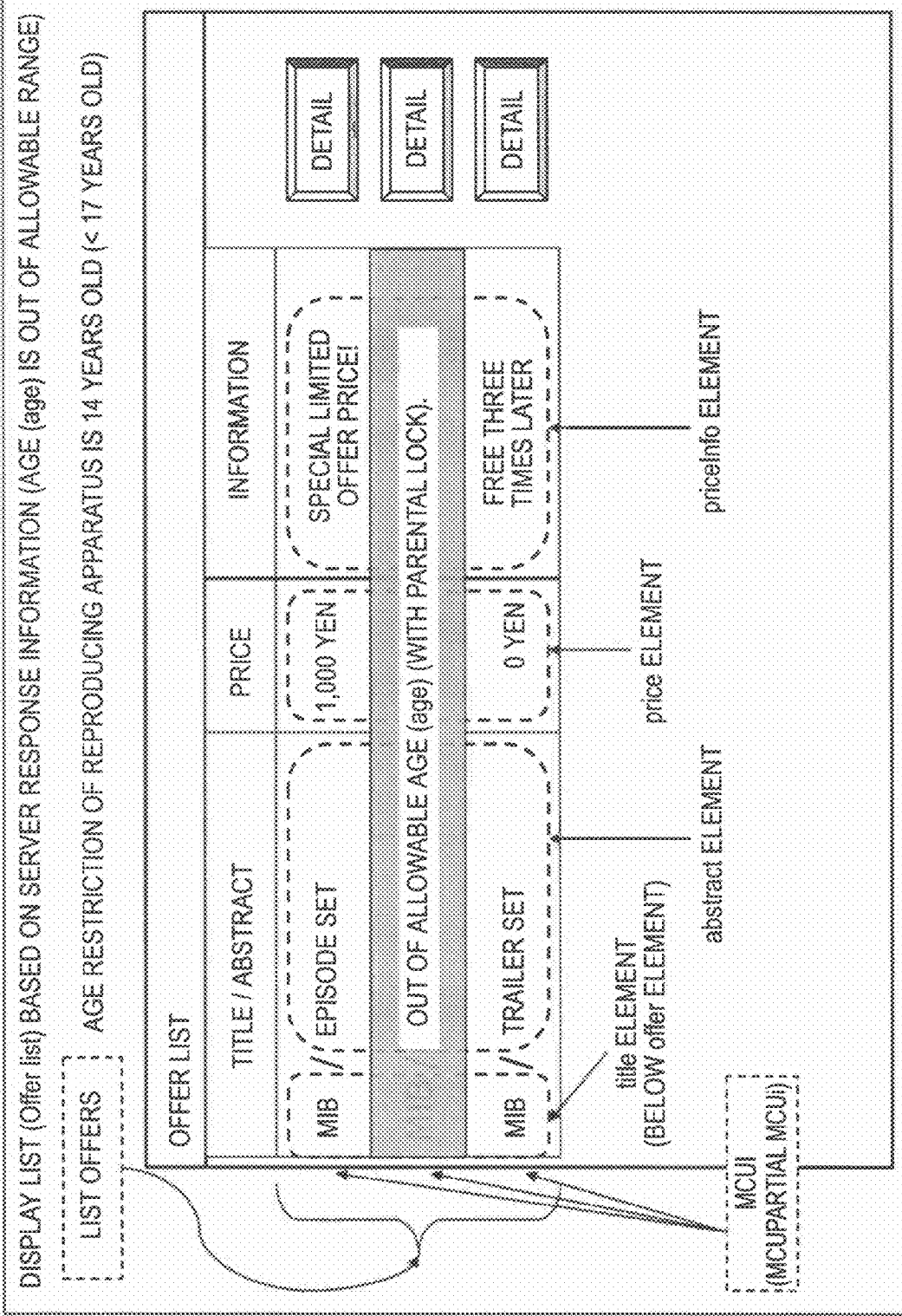
FIG. 17 is a diagram illustrating a display example of a content list based on server response information (Offer Response) which is provided from a management server.

FIG. 17 shows a display example when only a portion of contents stored in the first medium 110 having stored copy source contents is a content having age restriction.

Of the three entries of the upper, intermediate, and lower sides of a content list shown in FIG. 17, the intermediate entry is not displayed.

A content in the intermediate entry corresponds to the (b) copy unit [MCU_0002]: director's cut described above with reference to FIG. 12.

As described with reference to FIG. 12, data 303 is set data of the age restriction information (age). The set value of the age restriction information (age) of data 303 is "17", and this indicates that only a user who is 17 or older is a copy permitted user.

In performing display processing of a content list, the information processing apparatus 120 compares the set value "17" of the age restriction information (age) with the age restriction information (age) (for example, parental lock setting information) stored in the internal memory of the information processing apparatus 120. When the age restriction information (age) stored in the internal memory of the information processing apparatus 120 is, for example, "13" (for example, parental lock is set), it is determined that the setting of the information processing apparatus is not the age at which copying is permitted in the age restriction information (age), and display of the entry in the content list is stopped. For example, as shown in FIG. 17, display of a specific entry in the content list is not performed. Alternatively, a copy permitted content and an unpermitted content are displayed in a distinct display form, such as a grayout display.

As described above, exclusion from display as a content list allows a setting such that the data content is not known to, for example, a child.

Although in FIGS. 16 and 17, a display control example of the setting information of the region restriction information (region) and the age restriction information (age) has been described, with regard to other kinds of restriction information, that is, three-dimensional image restriction information and selection restriction information, similarly, it is determined whether or not a setting is made such that copying is not permitted, and when a setting is made such that copying is not permitted, a setting may be made such that display as a list is not performed.

[7. Processing Sequence in Information Processing Apparatus]

Next, a processing sequence which is executed in the information processing apparatus 120 will be described with reference to flowcharts of FIG. 18 and later.

A processing sequence described below is sequentially described.

(7-1) Overall processing sequence in which copy processing of contents to second medium as copy destination is performed and attribute file is recorded (FIGS. 18 to 21)

(7-2) Overall processing sequence in which copy processing of contents to second medium as copy destination is performed (no attribute file is recorded) (FIGS. 22 to 25)

Figure 26:
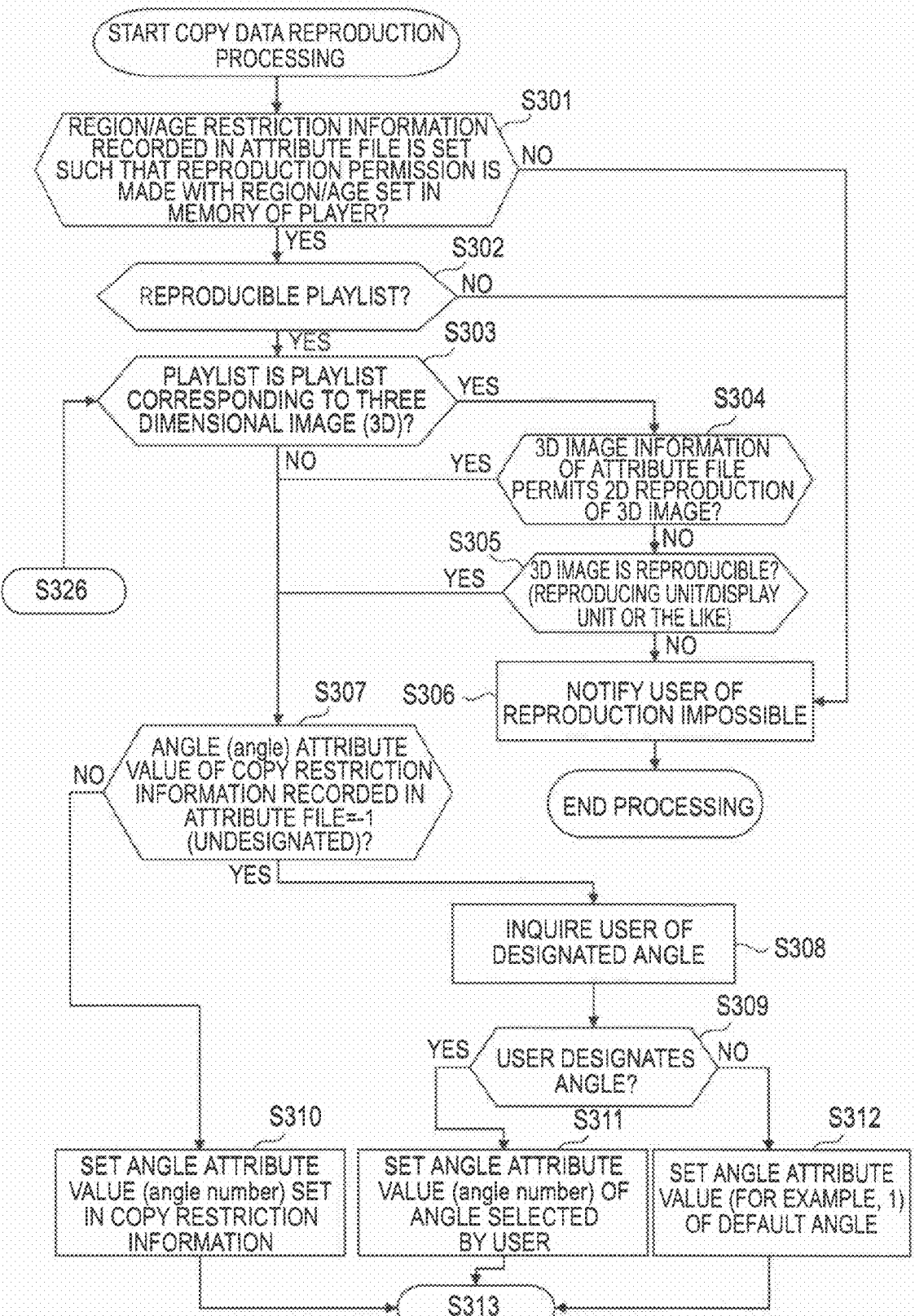
FIG. 26 is a flowchart illustrating a reproduction processing sequence of contents from a second medium as a copy destination.
Figure 27:
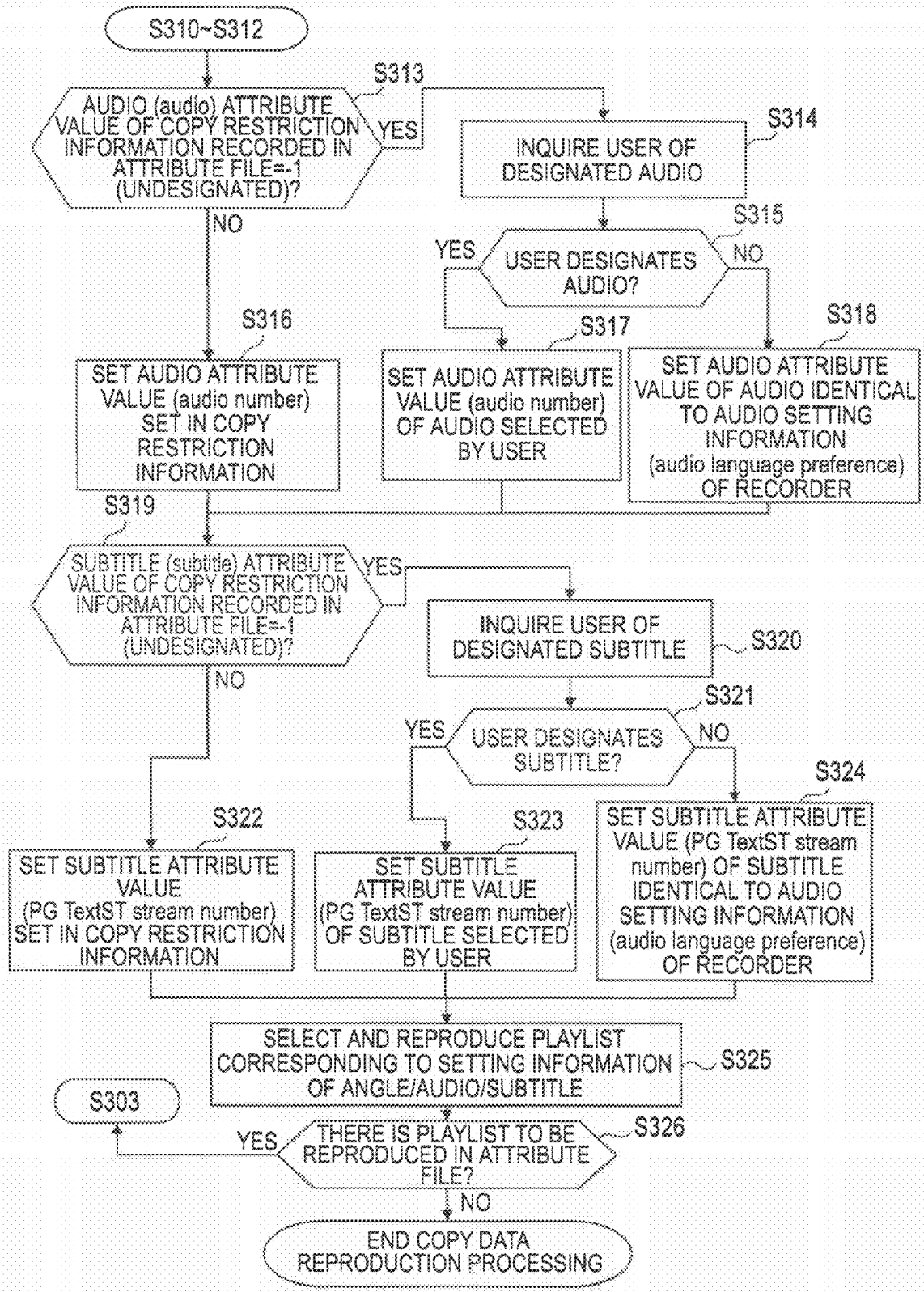
FIG. 27 is a flowchart illustrating a reproduction processing sequence of contents from a second medium as a copy destination.

(7-3) Reproduction processing sequence of copy data (FIGS. 26 and 27)

The above-described processing is processing which is performed in the information processing apparatus 120 shown in FIG. 4. The information processing apparatus 120 has a data processing unit which includes a CPU having a program execution function, and the processing is performed under the control of the data processing unit. An example of the hardware configuration of the information processing apparatus 120 will be described below.

(7-1. Overall Processing Sequence in which Copy Processing of Contents to Second Medium as Copy Destination is Performed and Attribute File is Recorded (FIG. 18)).

First, an overall processing sequence in which copy processing of contents to second medium as copy destination is performed and attribute file is recorded will be described with reference to FIG. 18.

When the copy destination medium is a medium, such as a hard disc, at the time of the reproduction processing of a copy content recorded in the hard disc, the same reproduction control processing as the BD-ROM reproduction sequence can be performed by using a reproduction processing program of the information processing apparatus. A copy processing sequence in a flowchart of FIG. 18 is a processing sequence when copy processing is performed on a second medium in which the same reproduction control processing as the BD-ROM reproduction sequence is possible. During the copy processing, an attribute file which stores copy restriction information or the like included in server response information received from the management server 140 is generated and recorded in the copy destination. In reproducing copy data, reproduction control is performed using data stored in the attribute file.

The processing in each step of the flow shown in FIG. 18 will be described.

In Step S101, the information processing apparatus reads the server response information (Offer Response) received from the management server.

Next, in Step S102, copy restriction information (region restriction information (region), age restriction information (age), and three-dimensional image (3D) restriction information) is acquired from the server response information. For example, information, such as data 300 in XML data described above with reference to FIG. 12, is acquired.

Next, in Step S103, it is determined whether or not the region restriction information (region) and the age restriction information (age) of the copy restriction information acquired from the server response information are set such that copy permission is made with region information and age information set in the memory of the recorder (information processing apparatus). The information processing apparatus 120 is denoted as a recorder in the flow.

As described above, the information processing apparatus 120 which performs the copy processing compares the region restriction information (region) received from the management server 140 with the region code or language code stored in the internal memory of the information processing apparatus 120. The information processing apparatus 120 also compares the age restriction information (age) received from the management server 140 with the age restriction information (age) (for example, parental lock setting information) stored in the internal memory of the information processing apparatus 120.

In Step S103, when it is determined that the region restriction information (region) and the age restriction information (age) of the copy restriction information acquired from the server response information are set such that copy permission is made with the region information and the age information set in the memory of the recorder (information processing apparatus), the process progresses to Step S104.

When it is determined that copy permission is not made, the process progresses to Step S112.

In Step S112, the user is notified that copying is impossible, and the processing ends. The notification form can be set in various ways. As an example, a notification is made by non-display processing or the like of a content list described above with reference to FIGS. 16 and 17.

In Step S103, when it is determined that the region restriction information (region) and the age restriction information (age) of the copy restriction information acquired from the server response information are set such that copy permission is made with the region information and the age information set in the memory of the recorder (information processing apparatus), the process progresses to Step S104. It is also determined whether or not the three-dimensional image (3D)

restriction information of the copy restriction information acquired from the server response information permits copying as a 2D image.

This processing is determination processing which is performed when a copy unit (MCU) as a content to be copied includes a three-dimensional image. When a content to be copied is a three-dimensional image, as described above, the three-dimensional image (3D) restriction information is recorded in the server response information.

The three-dimensional image (3D) restriction information is copy restriction information when three-dimensional image (3D) data is included in a content to be copied. Specifically, three kinds of restriction information described below are set in accordance with 3D contents.

(p1) To inhibit conversion from 3D to 2D and copying (p2) To permit conversion from 3D to 2D and copying, but to inhibit 2D reproduction (p3) To permit conversion from 3D to 2D and copying, and to permit 2D reproduction For example, when the three-dimensional image (3D) restriction information of the server response information is the setting (p1), the determination result in Step S104 is No and the process progresses to Step S105. When the three-dimensional image (3D) restriction information of the server response information is the setting (p2) or (p3), the determination result in Step S104 is Yes and the process progresses to Step S106.

If the determination result in Step S104 is No and the process progresses to Step S105, it is confirmed whether or not the recorder (information processing apparatus) can reproduce or display a three-dimensional image. When the recorder (information processing apparatus) cannot reproduce and display a three-dimensional image, copying of a 3D image is not carried out. In this case, the process progresses to Step S112. In Step S112, the user is notified that copying is impossible, and the processing ends. For example, a notification is made by non-display processing or the like of a content list described above with reference to FIGS. 16 and 17.

For example, when the three-dimensional image (3D) restriction information of the server response information is the setting (p2) or (p3), the determination result in Step S104 is Yes, and the process progresses to Step S106. Alternatively, when the three-dimensional image (3D) restriction information of the server response information is the setting (p1), the process progresses to Step S105, and it is confirmed that the recorder (information processing apparatus) can reproduce and display a three-dimensional image, the process progresses to Step S106.

In Step S106, a directory for setting copy data is created in the copy destination medium (in this example, a hard disc (HDD)). This is a directory corresponding to the second medium 150 described above with reference to FIG. 8 or 11.

Though not shown in this sequence, the three-dimensional image (3D) restriction information of the server response information may include two kinds of restriction information described below, in addition to the restriction information of (p1) to (p3).

(q1) To permit conversion to different 3D format and copying (q2) To inhibit conversion to different 3D format and copying When the restriction information is included, the information processing apparatus compares an encoding method of a content to be copied with a reproducible and displayable three-dimensional encoding method of the host apparatus to determine whether or not format conversion is made. When format conversion is necessary, it is confirmed whether or not the setting (q1) or (q2) is made.

When the setting (q2) to inhibit conversion to different 3D format and copying is made, copying is impossible. Thus, the processing in Step S112 is performed, that is, the user is notified that copying is impossible, and the processing ends.

When format conversion is not necessary or when the following setting is made as the three-dimensional image (3D) restriction information of the server response information, copying is possible.

(q1) To permit conversion to different 3D format and copying

Thus, the process progresses to Step S106, and a directory for setting copy data is created in the copy destination medium (in this example, a hard disc (HDD)).

If the directory setting in Step S106 is completed, the process progresses to Step S107.

In Step S107, an attribute file for HDD recording is generated, and the setting of the copy data information (deal Manifest) is copied. As described above with reference to FIG. 7, the copy data information (deal Manifest) is data which is included in the basic information of the server response information, and data of the server response information is copied as data stored in the attribute file.

Next, in Step S108, it is determined whether or not copying of a file recorded in the copy data information (deal Manifest) set as data stored in the attribute file is completed. Initially, copying is not completed, thus the process progresses to Step S109.

In Step S109, selection restriction information is copied as data stored in the attribute file. The selection restriction information refers to the following information which is included in the server response information (Offer Response).

(a) Audio (b) Subtitle (c) Angle (d) Angle information (angleInfo)

The details of this processing will be described below with reference to FIGS. 19 and 20.

If the processing in Step S109 in which the selection restriction information is copied as data stored in the attribute file ends, the process progresses to Step S110. In Step S110, copy processing is performed on selected data. Specifically, copy processing is performed on a playlist file, a clip information file, and an AV stream file. This processing is the same as the processing described with reference to FIG. 8. The details of the processing will be described below with reference to FIG. 21.

In Step S111, processing is performed for recording other kinds of data, for example, copy restriction information, playlist sequence information, or the like in the attribute file.

The playlist sequence information is set as data corresponding to copy units as a plurality of pieces of data in terms of units of copy processing which are included in recorded data of the first medium. The information processing apparatus performs processing for generating an attribute file which stores the playlist sequence information corresponding to a selected copy unit to be copied and recording the generated attribute file in the second medium. Alternatively, data may be stored in an attribute file which includes playlist sequence information corresponding to all copy units.

After this processing, the process returns to Step S108, and it is determined whether or not copying of a file recorded in the copy data information (deal Manifest) is completed. When copying is completed, the copy processing ends.

The playlist sequence information is set as data corresponding to copy units as a plurality of pieces of data in terms of units of copy processing which are included in recorded data of the first medium. The information processing apparatus performs processing for generating an attribute file which stores the playlist sequence information corresponding to a selected copy unit to be copied and recording the generated attribute file in the second medium.

Next, a detail sequence of the processing in Step S109, that is, the processing for copying the selection restriction information as data stored in the attribute file will be described with reference to flowcharts of FIGS. 19 and 20.

Figure 19:
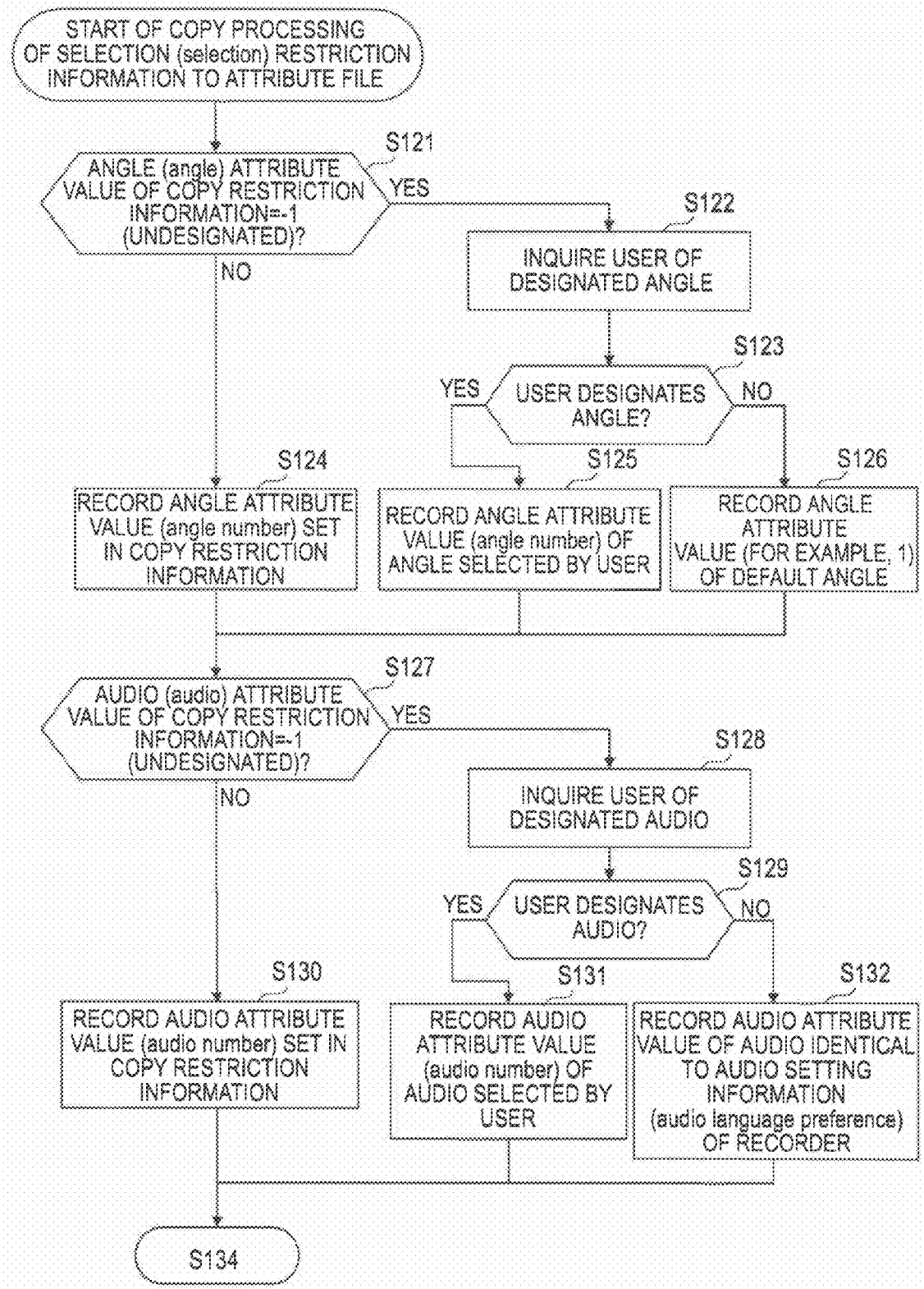
FIG. 19 is a flowchart illustrating a processing sequence in which copy processing of contents is performed to a second medium as a copy destination and an attribute file is further recorded.

The processing in Steps S121 to S126 of the flow of FIG. 19 is angle selection processing of a copy data according to the angle restriction information (angle) in the selection restriction information.

In Step S121 of FIG. 19, it is determined whether or not the attribute value of the angle restriction information (angle) recorded as the copy restriction information in the server response information (Offer Response) received from the management server is −1 (undesignated).

When the attribute value of the angle restriction information (angle) is −1 (undesignated), the process progresses to Step S122, and screen display is performed which causes the user to carry out angle designation. That is, display information which causes the user to input angle designation information is displayed on the display of the information processing apparatus.

In Step S123, it is determined whether or not the user inputs designation information. When the angle is designated, the process progresses to Step S125, and an attribute value (angle number) corresponding to the selected angle designated by the user is recorded. That is, the attribute value (angle number) is primarily held in the memory as selection information of copy data.

In Step S123, when it is determined that the user does not input designation information, the process progresses to Step S126, and an attribute value (angle number) corresponding to a predefined default angle is recorded. That is, the attribute value (angle number) is primarily held in the memory as selection information of copy data.

In Step S121, when it is determined that the attribute value of the angle restriction information (angle) is not −1 (undesignated), the process progresses to Step S124. In Step S124, the attribute value (≠−1) of the angle restriction information (angle) recorded as the copy restriction information is recorded. That is, the attribute value is primarily held in the memory as selection information of copy data.

With the above-described processing, the setting of an angle which should be selected as copy data is determined.

Next, the processing in Steps S127 to S132 is audio selection processing of copy data according to the audio restriction information (audio) in the selection restriction information.

In Step S127, it is determined whether or not the attribute value of the audio restriction information (audio) recorded as the copy restriction information in the server response information (Offer Response) received from the management server is −1 (undesignated).

When the attribute value of the audio restriction information (audio) is −1 (undesignated), the process progresses to Step S128, and screen display is performed which causes the user to carry out audio designation. That is, display information which causes the user to input audio designation information is displayed on the display of the information processing apparatus.

In Step S129, it is determined whether or not the user inputs designation information. When audio is designated, the process progresses to Step S131, and an attribute value (audio number) corresponding to selected audio designated by the user is recorded. That is, the attribute value is primarily held in the memory as selection information of copy data.

In Step S129, when it is determined that the user does not input designation information, the process progresses to Step S132, and an attribute value (audio number) corresponding to predefined default audio (audio language preference) is recorded. That is, the attribute value (audio number) is primarily held in the memory as selection information of copy data.

In Step S127, when it is determined that the attribute value of the audio restriction information (audio) is not −1 (undesignated), the process progresses to Step S130. In Step S130, the attribute value (≠−1) of the audio restriction information (audio) recorded as copy restriction information is recorded. That is, the attribute value is primarily held in the memory as selection information of copy data.

With the above-described processing, the setting of audio which should be selected as copy data is determined.

Figure 20:
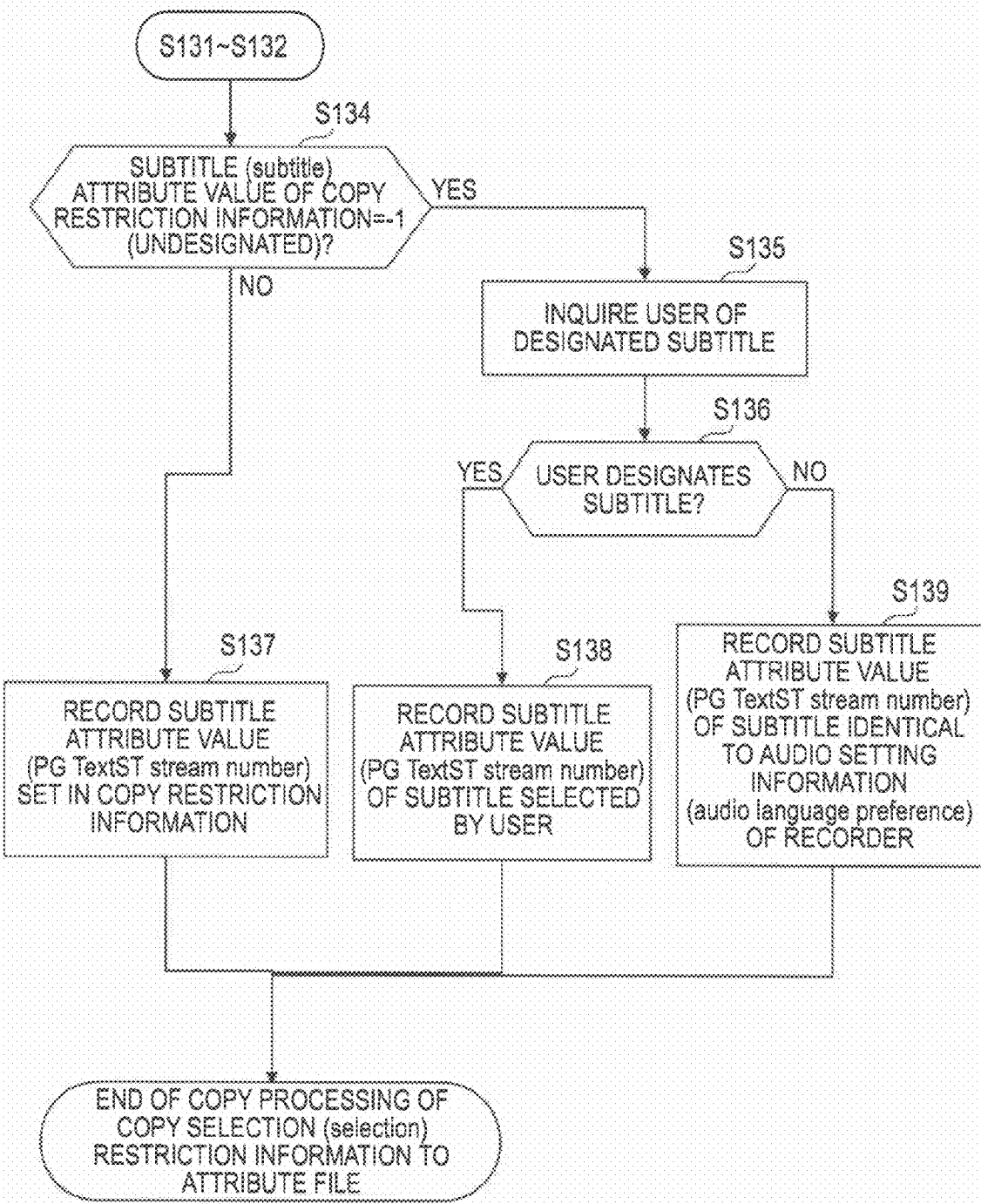
FIG. 20 is a flowchart illustrating a processing sequence in which copy processing of contents is performed to a second medium as a copy destination and an attribute file is further recorded.

Next, the processing in Steps S134 to S139 of FIG. 20 is subtitle selection processing of copy data according to the subtitle restriction information (subtitle) in the selection restriction information.

In Step S134, it is determined whether or not the attribute value of the subtitle restriction information (subtitle) recorded as the copy restriction information in the server response information (Offer Response) received from the management server is −1 (undesignated).

When the attribute value of the subtitle restriction information (subtitle) is −1 (undesignated), the process progresses to Step S135, and screen display is performed which causes the user to carry out subtitle designation. That is, display information which causes the user to input subtitle designation information is displayed on the display of the information processing apparatus.

In Step S136, it is determined whether or not the user inputs designation information. When the subtitle is designated, the process progresses to Step S138, and an attribute value (PG TextST stream number) corresponding to the selected subtitle designated by the user is recorded. That is, the attribute value is primarily held in the memory as selection information of copy data.

In Step S136, when it is determined that the user does not input designation information, the process progresses to Step S139, and an attribute value (PG TextST stream number) corresponding to a predefined default subtitle is recorded. That is, the attribute value is primarily held in the memory as selection information of copy data.

In Step S134, when it is determined that the attribute value of the subtitle restriction information (subtitle) is not −1 (undesignated), the process progresses to Step S137. In Step S137, the attribute value (PG TextST stream number≠−1) of the subtitle restriction information (subtitle) recorded as the copy restriction information is recorded. That is, the attribute value is primarily held in the memory as selection information of copy data.

With the above-described processing, the setting of a subtitle which should be selected as copy data is determined.

Figure 21:
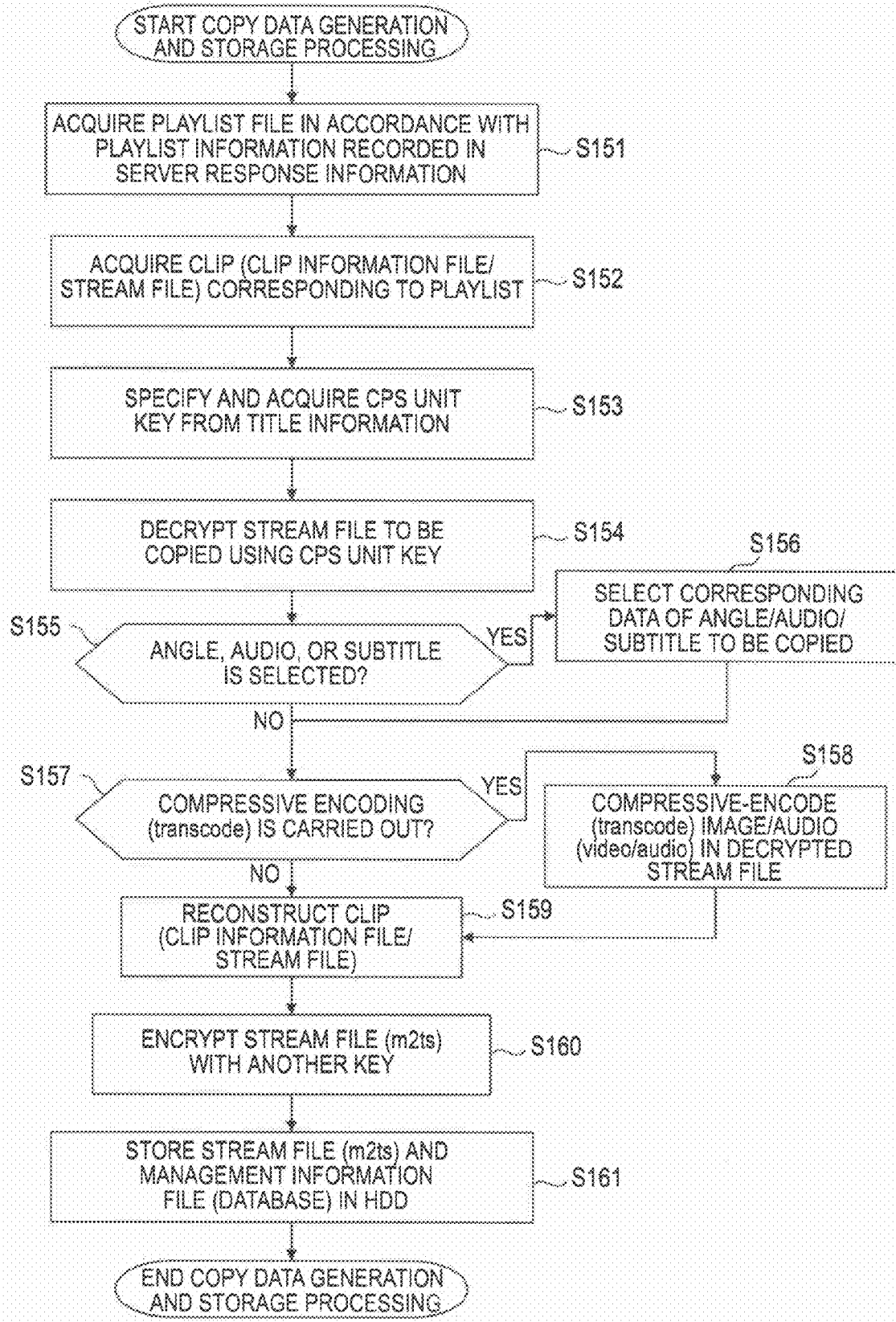
FIG. 21 is a flowchart illustrating a processing sequence in which copy processing of contents is performed to a second medium as a copy destination and an attribute file is further recorded.

Next, the processing in Step S110 of the flow of FIG. 18, that is, the detail sequence of copy processing of selected data will be described with reference to a flowchart of FIG. 21. Specifically, in Step S110, copy processing is performed on the playlist file, the clip information file, and the AV stream file.

A file to be copied is a file which is included in a copy unit with various kinds of restriction information cleared.

That is, a file to be copied is a content which is permitted to be copied with the copy restriction information (the region restriction information (region), the age restriction information (age), and the three-dimensional image restriction information) cleared, and is a copy unit selected by user's selection. It is assumed that the settlement processing has already been completed.

The processing in each step of the flow of FIG. 21 will be described.

First, in Step S151, a playlist file is acquired in accordance with playlist information recorded in the server response information (Offer Response). A file which is selected as being copied is a file which corresponds to a copy unit selected by the user. Selection is made using the copy data information in the server response information shown in FIG. 7.

Next, in Step S152, a clip (clip information file/stream file) corresponding to the playlist is acquired. The clip is selected on the basis of information recorded in the playlist file selected in Step S151.

Next, in Step S153, a CPS unit key is specified from title information or the like. The CPS unit key can also be selected using the copy data information in the server response information shown in FIG. 7.

Next, in Step S154, decryption processing of a stream file to be copied is performed using the CPS unit key acquired in Step S153.

Next, in Step S155, it is determined whether or not data to be copied is restricted to specific data from the viewpoint of specific angle, audio, and subtitle. For example, when copy permitted data by the selection restriction information is data in which at least one of angle, audio, and subtitle is restricted, the determination result in Step S155 is Yes. In this case, the process progresses to Step S156, copy data according to the restriction information is selected. Next, the process progresses to Step S157.

Meanwhile, when copy permitted data by the selection restriction information is data in which all of angle, audio and subtitle are not restricted, the determination result in Step S155 is No. In this case, the processing in Step S156 is not performed, and the process progresses to Step S157.

In Step S157, it is determined whether or not to carry out compressive encoding (Transcode). This is determined, for example, in accordance with the copy destination medium. Alternatively, the determination may be made by user's designation. When the copy destination medium has a setting such that only prescribed compressive-encoded data is recorded or when the user wants to reduce the data capacity, the determination result in Step S157 is Yes, and in Step S158, compressive encoding is carried out.

When compressive encoding in Step S158 is completed or when compressive encoding is not carried out, the process progresses to Step S159, and the clip (clip information file and stream) is reconstructed. That is, a clip having only data to be copied is generated.

Next, in Step S160, processing is performed for encrypting the stream file using a key according to the copyright management system (DRM) of the copy destination medium.

Finally, in Step S161, the encrypted stream file and other management information files (playlist, clip information file, and the like) are recorded in the second medium (in this example, an HDD) as the copy destination medium.

With the above-described processing, the copy processing is completed.

In the processing described with reference to the flow of FIGS. 18 to 21, a case has been described where data which is not permitted to be copied in the region restriction information, the age restriction information, or the three-dimensional image restriction information as the copy restriction information is not copied. However, as described above, the restriction information may be included in the attribute file and recorded in the copy destination medium. In this case, the copy processing may be permitted regardless of the copy restriction information, and then reproduction control may be performed using the copy restriction information in the attribute file as the reproduction restriction information in reproducing copy data.

That is, when reproduction control is possible using data recorded in the attribute file, the copy processing may be performed such that all pieces of data are copied, and reproduction control may be performed using the copy restriction information in the attribute file as the reproduction restriction information in reproducing copy data. With regard to the playlist sequence information, when the playlist sequence information recorded in the attribute file can be used in reproducing copy data, the playlist sequence information is recorded in the attribute file.

(7-2. Overall Processing Sequence in which Copy Processing of Contents to Second Medium as Copy Destination is Performed (No Attribute File is Recorded)).

Next, an overall processing sequence in which copy processing of contents to second medium as copy destination is performed but no attribute file is recorded will be described with reference to FIG. 22.

When the copy destination medium is a medium, for example, a flash memory or the like, there are many cases where the same reproduction control processing as the BD-ROM reproduction sequence cannot be performed by using the reproduction processing program of the information processing apparatus at the time of reproduction processing of a copy content recorded in the flash memory or the like.

When copy processing is performed on such a medium, even if an attribute file is recorded when the above-described hard disc is the copy destination, the attribute file cannot be used at the time of reproduction.

Thus, when recording processing is performed on such a medium, while no attribute file is generated and recorded, processing is performed for recording only copy permitted data (copy unit) in the copy destination medium.

Figure 22:
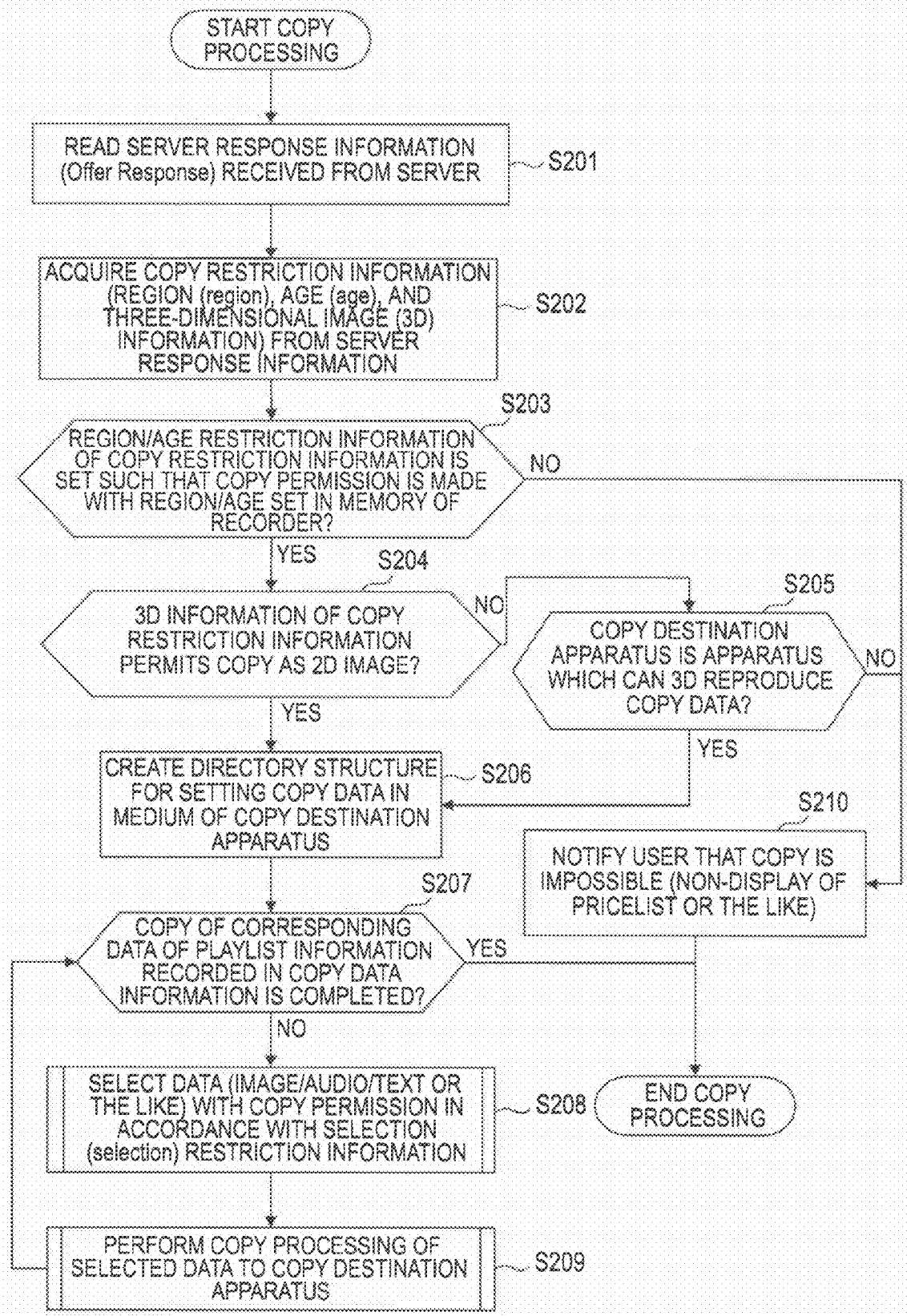
FIG. 22 is a flowchart illustrating a processing sequence when copy processing of contents is performed to a second medium as a copy destination and no attribute file is recorded.

A copy processing sequence in the flowchart of FIG. 22 is a sequence in which such copy processing is performed.

Each copy unit (MCU) which is set in the server response information (Offer Response) provided to the information processing apparatus 120 by the management server 140 is set as a copy unit with a copy destination medium designated in advance. This data corresponds to copy destination information (mvotInfo) in the server response information (Offer Response) shown in FIG. 7 described above. For example, even in the same content A, a copy unit is set in accordance with the copy destination medium. That is, the following settings are made.

copy unit 0001 of content A for hard disc
copy unit 0002 of content A for flash memory For example, even when a list of copy contents shown in FIG. 14 is presented, different entries are set and displayed in accordance with the copy destination medium. When the user selects an entry to be copied, the user confirms the copy destination medium and selects an entry. At the time of this selection, the copy destination medium is determined.

Figure 18:
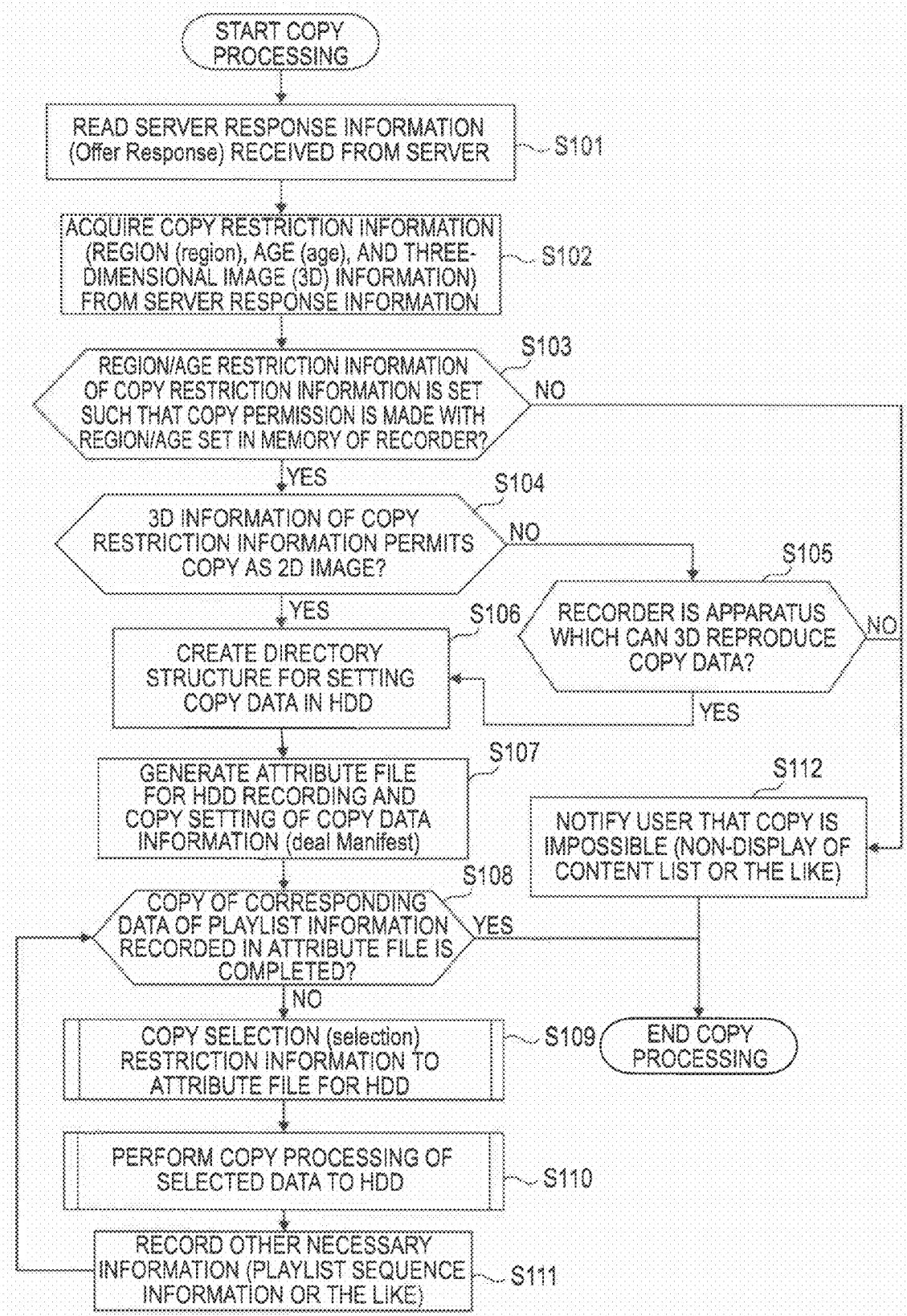
FIG. 18 is a flowchart illustrating a processing sequence in which copy processing of contents is performed to a second medium as a copy destination and an attribute file is further recorded.

When a hard disc is selected as the copy destination, the processing in the flowchart of FIG. 18 described above is performed. When a flash memory is selected as the copy destination, the processing in the flow of FIG. 22 is performed.

When the second medium as the copy destination is a hard disc, the information processing apparatus may determine that, during the reproduction processing of copy data, reproduction control is possible using copy permission information, which is recording information of the attribute file, as reproduction permission information, and may perform the processing for generating and recording the attribute file.

Each step of the flowchart of FIG. 22 will be described.

In Step S201, the information processing apparatus reads the server response information (Offer Response) received from the management server.

Next, in Step S202, copy restriction information (region restriction information (region), age restriction information (age), and three-dimensional image (3D) restriction information) is acquired from the server response information. For example, information, such as data 300 in XML data described above with reference to FIG. 12, is acquired.

Next, in Step S203, it is determined whether or not the region restriction information (region) and the age restriction information (age) of the copy restriction information acquired from the server response information are set such that copy permission is made with region information and age information set in the memory of the recorder (information processing apparatus).

As described above, the information processing apparatus 120 which performs the copy processing compares the region restriction information (region) received from the management server 140 with the region code or language code stored in the internal memory of the information processing apparatus 120. The information processing apparatus 120 also compares the age restriction information (age) received from the management server 140 with the age restriction information (age) (for example, parental lock setting information) stored in the internal memory of the information processing apparatus 120.

In Step S203, when it is determined that the region restriction information (region) and the age restriction information (age) of the copy restriction information acquired from the server response information are set such that copy permission is made with the region information and the age information set in the memory of the recorder (information processing apparatus), the process progresses to Step S204.

When it is determined that copy permission is not made, the process progresses to Step S210.

In Step S210, the user is notified that copying is impossible, and the processing ends. The notification form can be set in various ways. As an example, the notification is made by non-display processing or the like of a content list described above with reference to FIGS. 16 and 17.

In Step S203, when it is determined that the region restriction information (region) and the age restriction information (age) of the copy restriction information acquired from the server response information are set such that copy permission is made with the region information and the age information set in the memory of the recorder (information processing apparatus), the process progresses to Step S204. It is also determined whether or not the three-dimensional image (3D) restriction information of the copy restriction information acquired from the server response information permits copying as a 2D image.

This processing is determination processing which is performed when a copy unit (MCU) as a content to be copied includes a three-dimensional image. When a content to be copied is a three-dimensional image, as described above, the three-dimensional image (3D) restriction information is recorded in the server response information.

The three-dimensional image (3D) restriction information is copy restriction information when three-dimensional image (3D) data is included in a content to be copied. Specifically, three kinds of restriction information are set in accordance with 3D contents.

(p1) To inhibit conversion from 3D to 2D and copying
(p2) To permit conversion from 3D to 2D and copying, but to inhibit 2D reproduction
(p3) To permit conversion from 3D to 2D and copying, and to permit 2D reproduction For example, when the three-dimensional image (3D) restriction information of the server response information is the setting (p1), the determination result in Step S204 is No and the process progresses to Step S205. When the three-dimensional image (3D) restriction information of the server response information is the setting (p2) or (p3), the determination result in Step S204 is Yes and the process progresses to Step S206.

If the determination result in Step S204 is No, and the process progresses to Step S205, it is confirmed whether or not the recorder (information processing apparatus) can reproduce or display a three-dimensional image. When the recorder (information processing apparatus) cannot reproduce and display a three-dimensional image, copying of a 3D image is not carried out. In this case, the process progresses to Step S210. In Step S210, the user is notified that copying is impossible, and the processing ends. For example, the notification is made by non-display processing or the like of a content list described above with reference to FIGS. 16 and 17.

For example, when the three-dimensional image (3D) restriction information of the server response information is the setting (p2) or (p3), the determination result in Step S204 is Yes, and the process progresses to Step S206. Alternatively, when the three-dimensional image (3D) restriction information of the server response information is the setting (p1), the process progresses to Step S205, and it is confirmed that the recorder (information processing apparatus) can reproduce and display a three-dimensional image, the process progresses to Step S206.

In Step S206, a directory for setting copy data is created in the copy destination medium (in this example, a flash memory or the like). This is similar to a directory corresponding to the second medium 150 described above with reference to FIG. 8 or 11, but no attribute file is set.

Though not shown in this sequence, the three-dimensional image (3D) restriction information of the server response information may include two kinds of restriction information described below, in addition to the restriction information of (p1) to (p3).

(q1) To permit conversion to different 3D format and copying
(q2) To inhibit conversion to different 3D format and copying When the restriction information is included, the information processing apparatus compares an encoding method of a content to be copied with a reproducible and displayable three-dimensional encoding method of the host apparatus to determine whether or not format conversion is made. When format conversion is necessary, it is confirmed whether or not the setting (q1) or (q2) is made.

When the setting (q2) to inhibit conversion to different 3D format and copying is made, copying is impossible. Thus, Step S210 is executed, that is, the user is notified that copying is impossible, and the processing ends.

When format conversion is not necessary or when the following setting is made as the three-dimensional image (3D) restriction information of the server response information, copying is possible.

(q1) To permit conversion to different 3D format and copying

Thus, the process progresses to Step S106, and a directory for setting copy data is created in the copy destination medium (in this example, a flash memory or the like).

If the directory setting in Step S206 is completed, the process progresses to Step S207.

In Step S207, it is determined whether or not copying of a file recorded in the copy data information (deal Manifest) is completed. As described above with reference to FIG. 7, the copy data information (deal Manifest) is data which is included in the basic information of the server response information. Initially, copying is not completed, thus the process progresses to Step S208.

In Step S208, processing is performed for selecting only data, which satisfies the selection restriction, as copy data in accordance with the selection restriction information. The selection restriction information is included in the server response information (Offer Response)
 (a) Audio
 (b) Subtitle
 (c) Angle
 (d) Angle information (angleInfo)

The details of this processing will be described below with reference to FIGS. 23 and 24.

If the selection processing of copy data based on the selection restriction in Step S208 is completed, the process progresses to Step S209. In Step S209, copy processing of selected data is performed. Specifically, copy processing is performed on the playlist file, the clip information file, and the AV stream file. The details of this processing will be described below with reference to FIG. 25.

Next, the processing in Step S208, that is, the selection processing of data which satisfies the selection restriction information, specifically, the detail sequence of selection processing of data to be copied will be described with reference to a flowchart of FIG. 23.

Figure 23:
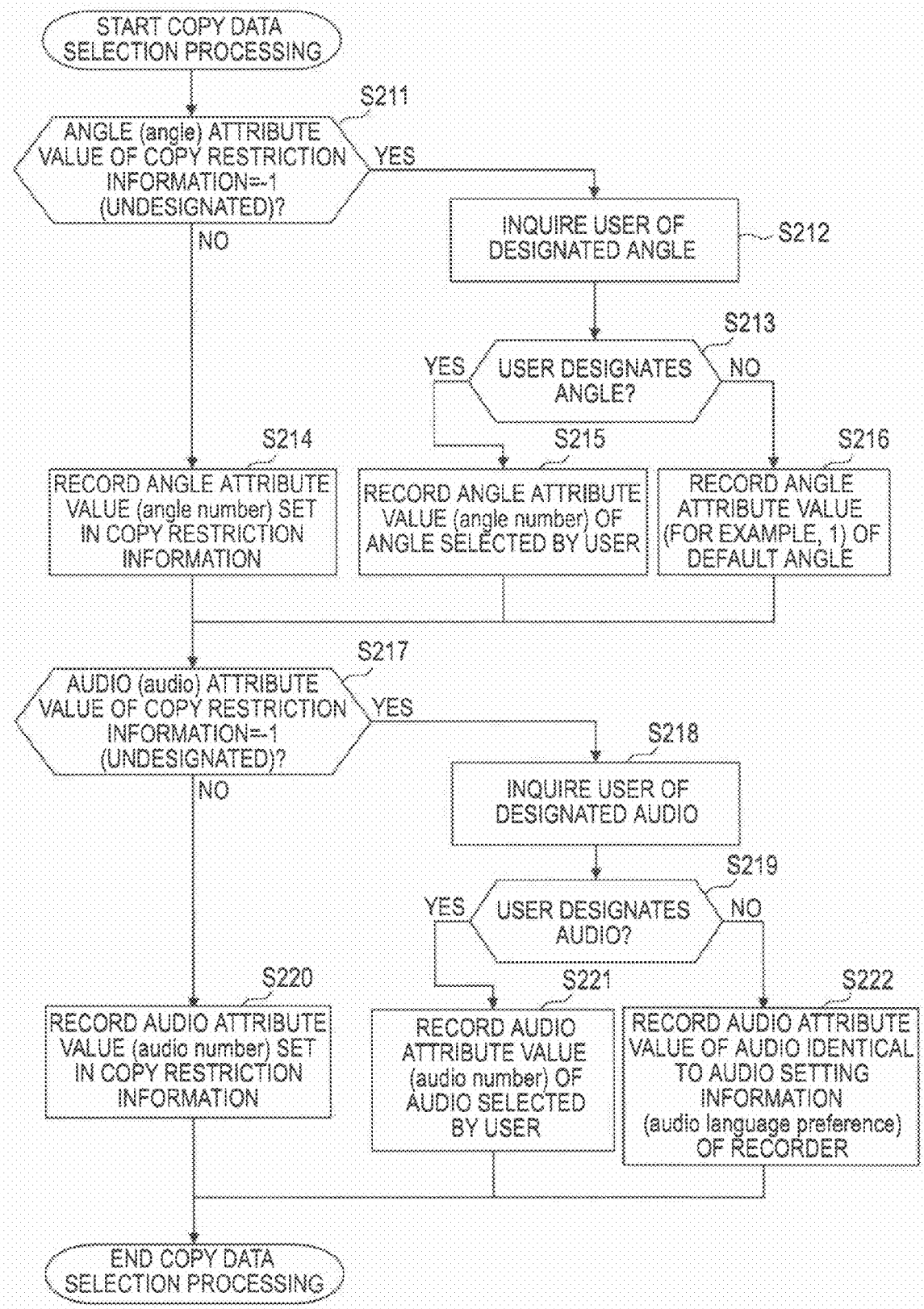
FIG. 23 is a flowchart illustrating a processing sequence when copy processing of contents is performed to a second medium as a copy destination and no attribute file is recorded.

The processing in Steps S211 to S216 of the flow of FIG. 23 is angle selection processing of copy data according to the angle restriction information (angle) in the selection restriction information.

In Step S211 of FIG. 23, it is determined whether or not the attribute value of the angle restriction information (angle) recorded as the copy restriction information in the server response information (Offer Response) received from the management server is −1 (undesignated).

When the attribute value of the angle restriction information (angle) is −1 (undesignated), the process progresses to Step S212, and screen display is performed which causes the user to carry out angle designation. That is, display information which causes the user to input angle designation information is displayed on the display of the information processing apparatus.

In Step S213, it is determined whether or not the user inputs designation information. When the angle is designated, the process progresses to Step S215, and an attribute value (angle number) corresponding to the selected angle designated by the user is recorded. That is, the attribute value (angle number) is primarily held in the memory as selection information of copy data.

In Step S213, when it is determined that the user does not input designation information, the process progresses to Step S216, and an attribute value (angle number) corresponding to a predefined default angle is recorded. That is, the attribute value (angle number) is primarily held in the memory as selection information of copy data.

In Step S211, when it is determined that the attribute value of the angle restriction information (angle) is not −1 (undesignated), the process progresses to Step S214. In Step S214, the attribute value (≠−1) of the angle restriction information (angle) recorded as the copy restriction information is recorded. That is, the attribute value is primarily held in the memory as selection information of copy data.

With the above-described processing, the setting of an angle which should be selected as copy data is determined.

Next, the processing in Steps S217 to S222 is audio selection processing of copy data according to the audio restriction information (audio) in the selection restriction information.

In Step S217, it is determined whether or not the attribute value of the audio restriction information (audio) recorded as the copy restriction information in the server response information (Offer Response) received from the management server is −1 (undesignated).

When the attribute value of the audio restriction information (audio) is −1 (undesignated), the process progresses to Step S218, and screen display is performed which causes the user to carry out audio designation. That is, display information which causes the user to input audio designation information is displayed on the display of the information processing apparatus.

In Step S219, it is determined whether or not the user inputs designation information. When audio is designated, the process progresses to Step S221, and an attribute value (audio number) corresponding to selected audio designated by the user is recorded. That is, the attribute value is primarily held in the memory as selection information of copy data.

In Step S219, when it is determined that the user does not input designation information, the process progresses to Step S222, and an attribute value (audio number) corresponding to predefined default audio (audio language preference) is recorded. That is, the attribute value (audio number) is primarily held in the memory as selection information of copy data.

In Step S217, when it is determined that the attribute value of the audio restriction information (audio) is not −1 (undesignated), the process progresses to Step S220. In Step S220, the attribute value (≠−1) of the audio restriction information (audio) recorded as copy restriction information is recorded. That is, the attribute value is primarily held in the memory as selection information of copy data.

With the above-described processing, the setting of an audio which should be selected as copy data is determined.

Figure 24:
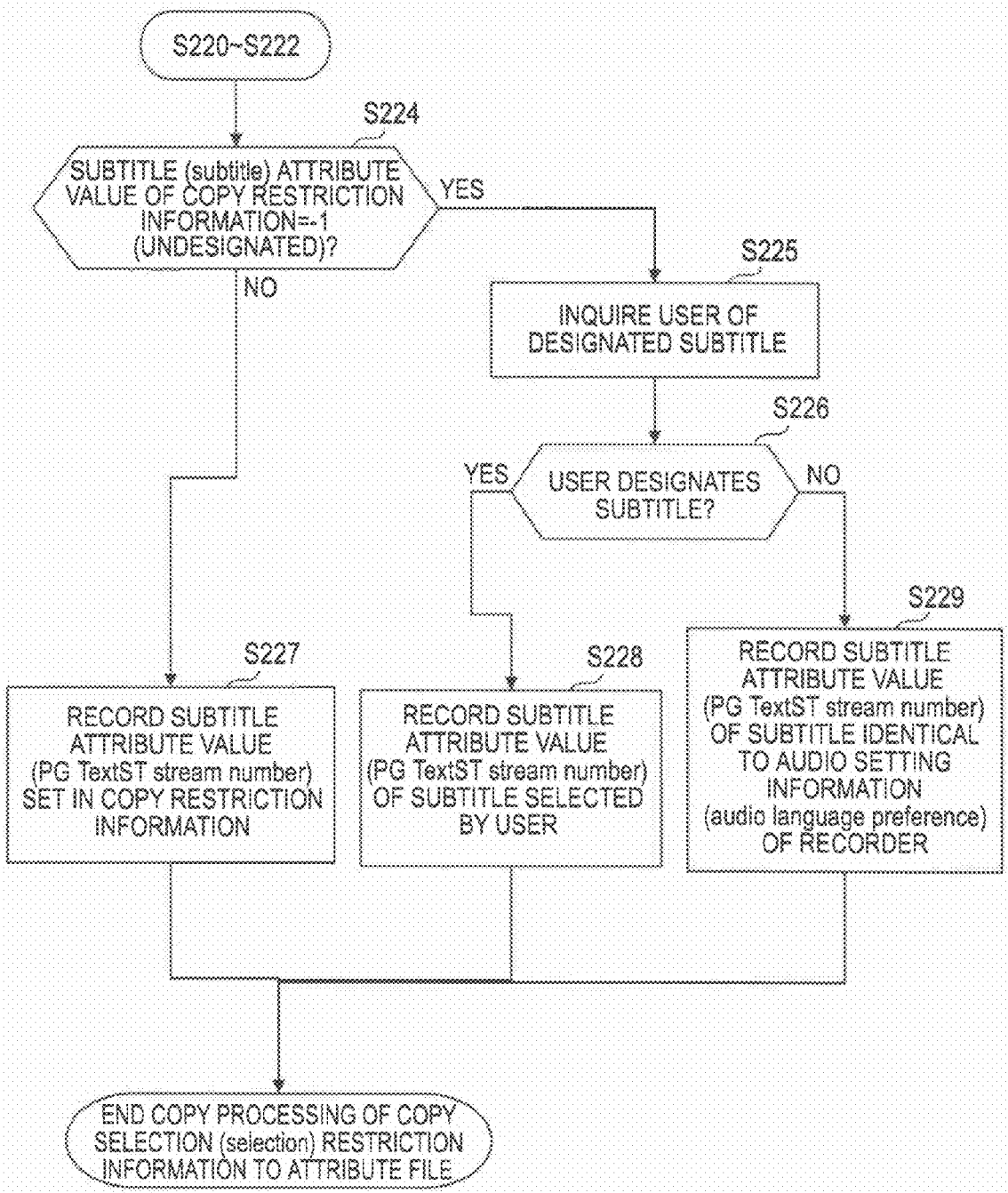
FIG. 24 is a flowchart illustrating a processing sequence when copy processing of contents is performed to a second medium as a copy destination and no attribute file is recorded.

Next, the processing in Steps S224 to S229 of FIG. 24 is subtitle selection processing of copy data according to the subtitle restriction information (subtitle) in the selection restriction information.

In Step S224, it is determined whether or not the attribute value of the subtitle restriction information (subtitle) recorded as the copy restriction information in the server response information (Offer Response) received from the management server is −1 (undesignated).

When the attribute value of the subtitle restriction information (subtitle) is −1 (undesignated), the process progresses to Step S225, and screen display is performed which causes the user to carry out subtitle designation. That is, display information which causes the user to input subtitle designation information is displayed on the display of the information processing apparatus.

In Step S226, it is determined whether or not the user inputs designation information. When the subtitle is designated, the process progresses to Step S228, and an attribute value (PG TextST stream number) corresponding to the selected subtitle designated by the user is recorded. That is, the attribute value is primarily held in the memory as selection information of copy data.

In Step S226, when it is determined that the user does not input designation information, the process progresses to Step S229, and an attribute value (PG TextST stream number) corresponding to a predefined default subtitle is recorded. That is, the attribute value is primarily held in the memory as selection information of copy data.

In Step S224, when it is determined that the attribute value of the subtitle restriction information (subtitle) is not −1 (undesignated), the process progresses to Step S227. In Step S227, the attribute value (PG TextST stream number≠−1) of the subtitle restriction information (subtitle) recorded as the copy restriction information is recorded. That is, the attribute value is primarily held in the memory as selection information of copy data.

With the above-described processing, the setting of a subtitle which should be selected as copy data is determined.

Figure 25:
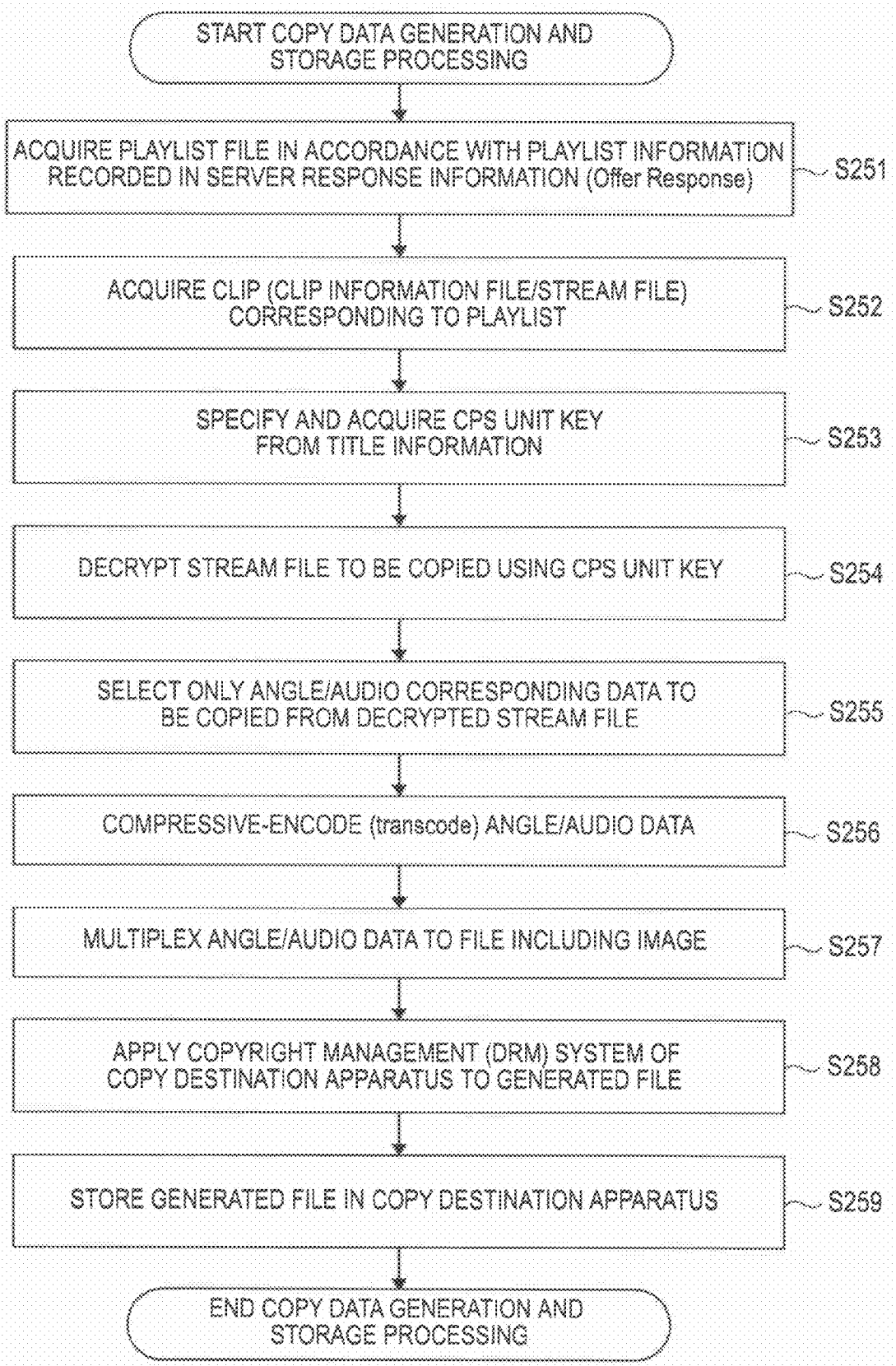
FIG. 25 is a flowchart illustrating a processing sequence when copy processing of contents is performed to a second medium as a copy destination and no attribute file is recorded.

Next, the processing in Step S209 of the flow of FIG. 22, that is, the detail sequence of copy processing of selected data will be described with reference to a flowchart of FIG. 25. Specifically, in Step S209, copy processing is performed on the playlist file, the clip information file, and the AV stream file.

A file to be copied is a file which is included in a copy unit with various kinds of restriction information cleared.

That is, a file to be copied is a content which is permitted to be copied with the copy restriction information (the region restriction information (region), the age restriction information (age), and the three-dimensional image restriction information) cleared, and is a copy unit selected by user's selection. It is assumed that the settlement processing has already been completed.

The processing in each step of the flow of FIG. 25 will be described.

First, in Step S251, a playlist file is acquired in accordance with playlist information recorded in the server response information (Offer Response). A file which is selected as being copied is a file which corresponds to a copy unit selected by the user. Selection is made using the copy data information in the server response information shown in FIG. 7.

Next, in Step S252, a clip (clip information file/stream file) corresponding to the playlist is acquired. The clip is selected on the basis of information recorded in the playlist file selected in Step S251.

Next, in Step S253, a CPS unit key is specified from title information or the like. The CPS unit key can also be selected using the copy data information in the server response information shown in FIG. 7.

Next, in Step S254, decryption processing of a stream file to be copied is performed using the CPS unit key acquired in Step S253.

Next, in Step S255, processing is performed for restricting data to be copied with specific angle, audio, and subtitle. This is, for example, extraction processing of data corresponding to the settings of angle, audio, and subtitle of copy permitted data by the selection restriction information.

In Step S256, compressive encoding (Transcode) is carried out on selected data. This is carried out, for example, as processing according to the copy destination medium.

Next, in Step S257, a multiplexed file corresponding to the format of the copy destination medium is created.

Next, in Step S258, processing is performed for encrypting the stream file using a key according to the copyright management system (DRM) of the copy destination medium.

Finally, in Step S259, the encrypted stream file and other management information files (playlist, clip information file, and the like) are recorded in the second medium (in this example, a flash memory or the like) as the copy destination medium.

With the above-described processing, the copy processing is completed.

(7-3. Reproduction Processing Sequence of Copy Data)

Next, a reproduction sequence of copy data from the copy destination medium will be described with reference to FIGS. 26 and 27. The reproduction sequence is a reproduction processing sequence from a medium in which an attribute file is recorded. That is, processing is performed for reproducing a copy content from a medium (for example, a hard disc (HDD)) which is subjected to the copy processing described above with reference to FIGS. 18 to 22. During the copy content reproduction processing, an attribute file set in the copy destination medium is read, and reproduction control is performed using each piece of restriction information recorded in the attribute file. Each piece of restriction information recorded in the attribute file is restriction information which is included in response information (Offer Response) provided to the information processing apparatus 120 by the management server 140, that is, copy restriction information, but in reproducing a copy content, each piece of restriction information is used as reproduction restriction information.

The processing in each step of a flowchart shown in FIGS. 26 and 27 will be described. A player which is described in the flow is an apparatus which can reproduce a copy content, and corresponds to, for example, the information processing apparatus 120 of FIG. 4.

In Step S301, the player (information processing apparatus 120) reads the attribute file from the copy destination medium, and acquire the copy restriction information recorded in the attribute file, that is, any one of the region restriction information (region), the age restriction information (age), and the three-dimensional image (3D) restriction information. For example, information, such as data 300 in XML data described above with reference to FIG. 12, is acquired. When there is no recorded information, reproduction restriction based on the restriction information is not carried out. When there is recorded information, reproduction restriction based on the recorded information is carried out.

In Step S301, it is determined whether or not the region restriction information (region) and the age restriction information (age) of the copy restriction information acquired from the attribute file are set such that copy permission is made with the region information and the age information set in the memory of the player (information processing apparatus).

The information processing apparatus 120 which performs the copy content reproduction processing compares the region restriction information (region) in the attribute film recorded in a medium which stores the copy content with the region code stored in the internal memory of the player (information processing apparatus 120). The information processing apparatus 120 also compares the age restriction information (age) in the attribute file with the age restriction information (age) (for example, parental lock setting information) stored in the internal memory of the information processing apparatus 120.

When it is determined that the region restriction information (region) and the age restriction information (age) of the copy restriction information acquired from the attribute file are set such that reproduction permission is made with the region information and the age information set in the memory of the player (information processing apparatus), the process progresses to Step S302. The recorded information of the attribute file is intrinsically the copy restriction information and information representing whether or not copying is permitted, but in reproducing a copy content, the recorded information is used as reproduction restriction information representing whether or not reproduction is permitted.

When it is determined that the setting of the attribute file does not permit copy content reproduction, the process progresses to Step S306. In Step S306, the user is notified that reproduction is impossible, and the processing ends.

In Step S301, when it is determined that the setting of the attribute file permits copy content reproduction, the process progresses to Step S302, and the presence/absence of a reproducible playlist from copy contents is determined. When there is no playlist, the process progresses to Step S306, the user is notified that reproduction is impossible, and the processing ends.

In Step S302, when it is determined that there is a reproducible playlist, the process progresses to Step S303, a reproducible playlist is selected, and it is determined whether or not the playlist is a playlist for reproducing a three-dimensional image (3D).

When the playlist is a playlist for reproducing a three-dimensional image (3D), the process progresses to Step S304, the three-dimensional image (3D) restriction information corresponding to the playlist is acquired from the attribute file, and it is determined whether or not the setting of the three-dimensional image (3D) restriction information permits copying as a 2D image. In this case, copy permission is regarded as reproduction permission.

As described above, the setting of the three-dimensional image (3D) restriction information has one of the following settings.

(p1) To inhibit conversion from 3D to 2D and copying
(p2) To permit conversion from 3D to 2D and copying, but to inhibit 2D reproduction
(p3) To permit conversion from 3D to 2D and copying, and to permit 2D reproduction The three kinds of restriction information are set in accordance with 3D contents.

When the three-dimensional image (3D) restriction information of the attribute file is the setting (p1) or (p2), the determination result in Step S304 is No and the process progresses to Step S305. When the three-dimensional image (3D) restriction information of the attribute file is the setting (p3), the determination result in Step S304 is Yes and the process progresses to Step S307.

If the determination result in Step S304 is No and the process progresses to Step S305, it is confirmed whether or not the player (information processing apparatus) can reproduce and display a three-dimensional image. When the player (information processing apparatus) cannot reproduce and display a three-dimensional image, reproduction of a 3D image cannot be carried out. In this case, the process progresses to Step S306. In Step S306, the user is notified that reproduction is impossible, and the processing ends.

When the three-dimensional image (3D) restriction information of the attribute file is the setting (p3), the determination result in Step S305 is Yes and the process progresses to Step S307.

When the determination result in Step S303 is No, when the determination result in Step S304 is Yes, or when the determination result in Step S305 is Yes, the process progresses to Step S307.

The processing in Step S307 and later is reproduction restriction processing of copy data based on the selection restriction recorded in the attribute file.

That is, processing is performed for selecting and reproducing copy data which satisfies the selection restriction information.

The processing in Steps S307 to S312 of the flow of FIG. 26 is angle selection processing of reproducing data according to the angle restriction information (angle) in the selection restriction information.

In Step S307 of FIG. 26, it is determined whether or not the attribute value of the angle restriction information (angle) recorded as the copy restriction information in the attribute file is −1 (undesignated).

When the attribute value of the angle restriction information (angle) is −1 (undesignated), the process progresses to Step S308, and screen display is performed which causes the user to carry out angle designation. That is, display information which causes the user to input angle designation information is displayed on the display of the information processing apparatus.

In Step S309, it is determined whether or not the user inputs designation information. When the angle is designated, the process progresses to Step S311, an attribute value (angle number) corresponding to the selected angle designated by the user is recorded. That is, the attribute value is primarily held in the memory as selection information of copy data which should be reproduced.

In Step S309, when it is determined that the user does not input designation information, the process progresses to Step S312, and an attribute value (angle number) corresponding to a predefined default angle is recorded. That is, the attribute value is primarily held in the memory as selection information of copy data which should be reproduced.

In Step S307, when it is determined that the attribute value of the angle restriction information (angle) is not −1 (undesignated), the process progresses to Step S310. In Step S310, the attribute value (≠−1) of the angle restriction information (angle) recorded as the copy restriction information (=reproduction restriction information) in the attribute file is recorded. That is, the attribute value is primarily held in the memory as selection information of copy data to be reproduced.

With the above-described processing, the setting of an angle which should be selected as reproducing data from data copied to the second medium is determined.

The processing in Steps S313 to S318 of FIG. 27 is audio selection processing of copy data which should be reproduced according to the audio restriction information (audio) in the selection restriction information recorded in the attribute file.

In Step S313, it is determined whether or not the attribute value of the audio restriction information (audio) recorded as the copy restriction information (=reproduction restriction information) in the attribute file is −1 (undesignated).

When the attribute value of the audio restriction information (audio) is −1 (undesignated), the process progresses to Step S314, and screen display is performed which causes the user to carry out audio designation. That is, display information which causes the user to input audio designation information is displayed on the display of the information processing apparatus.

In Step S315, it is determined whether or not the user inputs designation information. When the audio is designated, the process progresses to Step S317, and an attribute value (audio number) corresponding to selected audio designated by the user is recorded. That is, the attribute value is primarily held in the memory as selection information of copy data to be reproduced.

In Step S315, when it is determined that the user does not input designation information, the process progresses to Step S318, and an attribute value (audio number) corresponding to predefined default audio (audio language preference) is recorded. That is, the attribute value is primarily held in the memory as selection information of copy data to be reproduced.

In Step S313, when it is determined that the attribute value of the audio restriction information (audio) in the attribute file is not −1 (undesignated), the process progresses to Step S316. In Step S316, the attribute value (≠−1) of the audio restriction information (audio) recorded as the copy restriction information is recorded. That is, the attribute value is primarily held in the memory as selection information of copy data to be reproduced.

With the above-described processing, the setting of audio which should be selected as reproducing data is determined.

The processing in Steps S319 to S324 is subtitle selection processing of copy data which should be reproduced according to the subtitle restriction information (subtitle) in the selection restriction information recorded in the attribute file.

In Step S319, it is determined whether or not the attribute value of the subtitle restriction information (subtitle) recorded as the copy restriction information (=reproduction restriction information) in the attribute file is −1 (undesignated).

When the attribute value of the subtitle restriction information (subtitle) is −1 (undesignated), the process progresses to Step S320, and screen display is performed which causes the user to carry out subtitle designation. That is, display information which causes the user to input subtitle designation information is displayed on the display of the information processing apparatus.

In Step S321, it is determined whether or not the user inputs designation information. When the subtitle is designated, the process progresses to Step S323, and an attribute value (PG TextST stream number) corresponding to the selected subtitle designated by the user is recorded. That is, the attribute value is primarily held in the memory as selection information of copy data to be reproduced.

In Step S321, when it is determined that the user does not input designation information, the process progresses to Step S324, and an attribute value (PG TextST stream number) corresponding to a predefined default subtitle is recorded. That is, the attribute value is primarily held in the memory as selection information of copy data to be reproduced.

In Step S319, when it is determined that the attribute value of the subtitle restriction information (subtitle) in the attribute file is not −1 (undesignated), the process progresses to Step S322. In Step S322, the attribute value (PG TextST stream number≠−1) of the subtitle restriction information (subtitle) recorded as the copy restriction information is recorded. That is, the attribute value is primarily held in the memory as selection information of copy data to be reproduced.

With the above-described processing, the setting of a subtitle which should be selected as reproducing data from data copied to the second medium is determined.

Next, in Step S325, data having angle, audio, and subtitle determined through the above-described processing is selected from copy data, and reproduction processing is performed.

Finally, in Step S326, the presence/absence of a playlist to be reproduced is determined from the recorded information of the attribute file, and when there is an unprocessed playlist, the process returns to Step S303. The processing in Step S303 and later is performed on the unprocessed playlist.

Eventually, in Step S326, when it is determined that there is no reproducing playlist, the reproduction processing ends.

As described above, when an attribute file is recorded in the copy destination, in reproducing a copy content, information in the attribute file is applied and processing is performed using the content copy restriction information as the reproduction restriction information.

In reproducing copy data recorded in the second medium, for example, the information processing apparatus acquires the playlist sequence information from the attribute file and performs the reproduction processing in accordance with the acquired playlist sequence information, realizing correct content reproduction.

[8. Configuration Example of Information Processing Apparatus]

A configuration example of the information processing apparatus 120 according to the embodiment of the invention will be described with reference to FIG. 28. The information processing apparatus 120 has a configuration such that the first medium 110 which is a medium having recorded copy source contents and the second medium 150 which is a copy destination of contents are mountable. It is not necessary that two mediums are mounted. For example, the copy destination medium may be mounted in another apparatus which is connected to the information processing apparatus through a USB cable, wireless communication, or the like and may output copy data.

As the first medium 110 and the second medium 150, for example, various mediums (information recording medium), such as a Blu-ray Disc (Registered Trademark), a DVD, a hard disc, and a flash memory, may be used.

As shown in FIG. 28, the information processing apparatus 120 has a data processing unit (control unit) 501, a communication unit 502, an input unit 503, an output unit 504, a memory 505, a first medium interface 506, and a second medium interface 507.

The data processing unit 501 is constituted by a CPU or the like which has a program execution function of executing various data processing programs. For example, the data processing unit 501 executes a program which executes the copy processing according to each flowchart described above, in addition to data recording/reproducing processing. The data processing unit 501 performs overall control of processing, such as communication processing with the management server 140 through the communication unit 102, which is executed by the apparatus.

The communication unit 502 is used for communication processing with the management server 140. The communication unit 502 is used for requesting and receiving the server response information (Offer Response) including the copy data information (dealManifest), settlement processing, or reception processing of the copy permission information (Permission).

The input unit 503 is, for example, an operation unit which is operated by the user, and receives various inputs, such as inputs of data recording or reproducing instruction, and copy instruction. The input unit 503 includes a remote control device, and can input remote operation information. The output unit 504 is an image or audio output unit which is constituted by a display, a speaker, or the like. The memory 505 is constituted by a RAM, a ROM, or the like, and is used as a storage area of programs which are executed in the data processing unit 501, various parameters, and received data. The memory 505 is also used as a buffer area of copy data. The memory 505 is also used as an area where the set value or the like of the region information (region) or the age information (age) (=parental lock) of the information processing apparatus is recorded.

The first medium interface 506 is an interface which is applied to data recording, reproduction, and copy processing using the first medium 110. Data writing, data reading processing, data copy processing, or the like using the first medium 110 is performed in accordance with a request from the data processing unit 501.

The second medium interface 507 is an interface which is applied to data recording, reproduction processing, and copy processing using the second medium 150. Data writing, data reading processing, data copy processing, or the like using the second medium 150 is performed in accordance with a request from the data processing unit 501.

The invention has been described above in detail in connection with specific examples. However, it is obvious that modifications and substitutions of the examples can be made without departing from the spirit and scope of the invention. That is, the invention has been disclosed as exemplary embodiments, and should not be construed as being limited. In order to determine the gist of the invention, the claims should be taken into consideration.

Note that the series of processes described in the specification can be executed by hardware, software, or a combination of both. In the case where the series of processes is to be performed by software, a program recording the processing sequence may be installed in a memory in a computer embedded in dedicated hardware and executed. Alternatively, the program may be installed on a general-purpose computer capable of performing various processes and executed. For example, the program may be recorded on a recording medium in advance. Note that, besides installing the program from the recording medium to a computer, the program may be installed on a recording medium such as an internal hard disk via a network such as a LAN (Local Area Network) or the Internet.

Note that the various processes described in the specification are not necessarily performed sequentially in the orders described, and may be performed in parallel or individually in accordance with the processing performance or necessity of an apparatus that performs the processes. The system in the present specification refers to a logical assembly of a plurality of apparatuses and is not limited to an assembly in which apparatuses having individual structures are contained in a single housing.

As described above, the embodiment of the invention provides a configuration which can copy playlist sequence information applied to reproduction of copy data during data copy processing between mediums and can be used at the time of reproduction. In the information processing apparatus which performs copy processing for recording recorded data of the first medium in the second medium, the data processing unit performs processing for generating the attribute file which stores playlist sequence information representing the use sequence of a playlist applied to the reproduction processing of copy data included in received information from the management server and recording the attribute file in the copy destination. In reproducing copy data recorded in the second medium, the playlist sequence information is acquired from the attribute file, and the reproduction processing is performed in accordance with the acquired playlist sequence information, realizing correct content reproduction.

The present application contains subject matter related to that disclosed in Japanese Priority Patent Application JP 2010-089914 filed in the Japan Patent Office on Apr. 8, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    a data processing unit operable to:
        perform copy processing for recording recorded data of a first medium on a second medium;
        receive, from a management server, playlist sequence information and three-dimensional image restriction information, wherein the playlist sequence information selects one or more playlists to reproduce data copied into the second medium, wherein the three-dimensional image restriction information is set to permit or restrict copying of content when three-dimensional image data is included in the content to be copied; and
        perform processing for generating an attribute file that stores the playlist sequence information and the three-dimensional image restriction information, and record the generated attribute file in the second medium.

2. The information processing apparatus according to claim 1, wherein the playlist sequence information is set as data corresponding to a plurality of copy units included in the recorded data of the first medium, and wherein the data processing unit performs processing for generating the attribute file which stores the playlist sequence information corresponding to a copy unit of the plurality of copy units, selected as a copy target and records the generated attribute file in the second medium.

3. The information processing apparatus according to claim 1, wherein, upon determination that reproduction control is possible using the playlist sequence information during reproduction processing of the copied data from the second medium, the data processing unit performs the processing for generating and recording the attribute file.

4. The information processing apparatus according to claim 1, wherein, upon determination that the second medium is a hard disk, the data processing unit determines whether reproduction control is possible using the playlist sequence information, during reproduction processing of the copied data, and performs the processing for generating and recording the attribute file.

5. An information processing system comprising:
    an information processing apparatus which performs copy processing for recording recorded data of a first medium on a second medium; and
    a management server which provides information relating to the copy processing to the information processing apparatus,
    wherein the information processing apparatus is operable to:
    transmit a copy execution request to copy recorded data of the first medium to the management server, wherein the management server transmits server response information comprising playlist sequence information and three-dimensional image restriction information to the information processing apparatus in response to receiving the copy execution request;
    perform processing for generating an attribute file which stores the playlist sequence information and the three-dimensional image restriction information, and record the generated attribute file in the second medium, wherein the three-dimensional image restriction information is set to permit or restrict copying of content when three-dimensional image data is included in the content to be copied.

6. An information processing method comprising:

in an information processing apparatus performing copy processing for recording recorded data of a first medium on a second medium:

receiving, from a management server, playlist sequence information, wherein the playlist sequence information is operable to select one or more playlists to reproduce data copied into the second medium;

receiving, from the management server, three-dimensional image restriction information, wherein the three-dimensional image restriction information is set to permit or restrict copying of content when three-dimensional image data is included in the content to be copied;

generating an attribute file which stores the playlist sequence information and the three-dimensional image restriction information; and recording the generated attribute file in the second medium.

7. A non-transitory computer readable storage medium having instructions stored therein, which when executed by a processor, causes the processor to execute a method comprising:

in an information processing apparatus performing copy processing for recording recorded data of a first medium on a second medium:

receiving, from a management server, playlist sequence information, wherein the playlist sequence information selects one or more playlists to reproduce data copied into the second medium;

receiving, from the management server, three-dimensional image restriction information, wherein the three-dimensional image restriction information is set to permit or restrict copying of content when three-dimensional image data is included in the content to be copied;

generating an attribute file which stores the playlist sequence information and the three-dimensional image restriction information; and recording the generated attribute file in the second medium.

8. The information processing apparatus according to claim 1, wherein the playlist sequence information of the attribute file is read and one of the one or more playlists is selected in accordance with the playlist sequence information to perform reproduction.

9. The information processing apparatus according to claim 1, wherein the data processing unit receives and stores selection restriction information in the attribute file, wherein the selection restriction information comprises one or more of: audio restriction information, subtitle restriction information, or angle restriction information.

10. The information processing apparatus according to claim 1, wherein a setting of the attribute file determines whether or not the reproduction of the copied copy data is permitted.

11. The information processing apparatus according to claim 1, wherein when performing copy processing for recording the recorded data of the first medium in the second medium, the data processing unit copies the recorded data of the first medium that does not depart from one or more restrictions in selection restriction information received from the management server.

12. The information processing apparatus according to claim 1, wherein the playlist sequence information represents a use sequence of the one or more playlists to reproduce the copy copied data recorded in the second medium.

13. The information processing apparatus according to claim 1, wherein the data processing unit receives and stores selection restriction information comprising audio restriction information for permitting copying of the content corresponding to audio of the content.

14. The information processing apparatus according to claim 13, wherein the audio restriction information permits copying of the content corresponding to the audio in one of a plurality of languages.

15. The information processing apparatus according to claim 1, wherein the content comprises a plurality of angle images each of which focuses on a specific member among a plurality of members, and wherein selection restriction information received from the management server comprises angle restriction information that permits copying of the content corresponding to a specific angle from the content.

16. The information processing apparatus according to claim 1, wherein the attribute file comprises region restriction information, wherein the region restriction information comprises restriction information corresponding to a region where copying is permitted.

17. The information processing apparatus according to claim 1, wherein the attribute file comprises age restriction information, wherein the age restriction information comprises information restricting an age at which copying is permitted.

* * * * *